(12) United States Patent
Newland

(10) Patent No.: US 8,869,464 B2
(45) Date of Patent: Oct. 28, 2014

(54) CORRELATED HYPERBOLIC PARABOLOID STRUCTURAL MEMBERS

(71) Applicant: Dennis John Newland, Port Townsend, WA (US)

(72) Inventor: Dennis John Newland, Port Townsend, WA (US)

( * ) Notice: Subject to any disclaimer, the term of this patent is extended or adjusted under 35 U.S.C. 154(b) by 0 days.

(21) Appl. No.: 13/684,501

(22) Filed: Nov. 24, 2012

(65) Prior Publication Data

US 2014/0149085 A1    May 29, 2014

(51) Int. Cl.
  *E04B 7/10*    (2006.01)
  *G06F 17/10*   (2006.01)
(52) U.S. Cl.
  CPC ..................... *G06F 17/10* (2013.01)
  USPC ............................ 52/80.2; 52/80.1
(58) Field of Classification Search
  CPC ......... Y10S 52/10; E04B 7/102; E04C 2/326; E04C 2/328
  USPC .......................... 52/80.2, 80.1, DIG. 10, 81.1
  See application file for complete search history.

(56) References Cited

U.S. PATENT DOCUMENTS

| | | | | | |
|---|---|---|---|---|---|
| 3,221,464 | A | * | 12/1965 | Miller | 52/651.09 |
| 3,568,381 | A | * | 3/1971 | Hale | 52/81.4 |
| 3,757,478 | A | * | 9/1973 | Pryor | 52/80.2 |
| 3,798,849 | A | * | 3/1974 | Biggs et al. | 52/80.2 |
| 5,020,287 | A | * | 6/1991 | Woods | 52/80.2 |

OTHER PUBLICATIONS

Structure in Nature is a Strategy for Design by Peter Pearce, fifthe printing 1990, p. 88.

* cited by examiner

*Primary Examiner* — Basil Katcheves

(57) ABSTRACT

Utilizing the three different hyperbolic paraboloids which each divide a set of correlating tetrahedrons in half, new, unique interconnectable structural members and toys have been created. They include the n-fold hyperbolic paraboloids, the n-fold hyperbolic paraboloid lattice assemblies and many other cellular, lattice and labyrinthal structures. Some have stacking properties and all have interlocking characteristics and are inherently strong and rigid due to the use of hyperbolic paraboloids. The interlocking and stacking characteristics of these structural members result from the saddle shaped compound curvature of the hyperbolic paraboloids. These structural members can be combined in multiple ways to build aesthetic and utilitarian components such as beams, trusses, packaging foams, toys, as well as other repeating cellular, lattice and labyrinthal structures. The hyperbolic paraboloids of this application can be affixed to other structural members such as bars or spheres to enable connecting them in an interlocking fashion. These new structural members effectively harness material properties to result in inherent strength and rigidity.

18 Claims, 13 Drawing Sheets

CORRELATED HYPERBOLIC PARABOLOID STRUCTURAL MEMBERS

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field

This application relates to static geometric space defining structures, specifically to such structures which utilize hyperbolic paraboloids. In particular, this application relates to use of any of the three different hyperbolic paraboloids that divide a Correlating Tetrahedron (CT) in half.

2. Prior Art

This application is a substitute for application Ser. No. 12,395,974 necessitated by the discovery of significant new uses of this technology. Also, about two years after filing application Ser. No. 12,395,974, the applicant discovered that Peter Pearce, in his book *Structure in Nature is a Strategy for Design*, had independently discovered what the applicant calls a 4-fold hyperbolic paraboloid—Pearce called it a saddle tetrahedron. This discovery was disclosed to the USPTO as required. Several significant new uses of the 4-fold hyperbolic paraboloid are disclosed in this application and claimed as new uses.

The tetrahedron has been commonly used in trusses. The regular tetrahedron, which is one of the five platonic solids, is composed of four faces that are equilateral triangles, six edges between these faces, and four vertices where the corners of three triangular faces meet. This regular tetrahedron is not included in the technology of this application. The Correlating Tetrahedrons (CTs) of this application all have isosceles triangular faces with one L2 edge and two L1 edges (the L1 and L2 edges are further defined later in this specification). During pursuit of a light weight tetrahedral structure, the applicant discovered the multitude of ways the hyperbolic paraboloids which divide the CT in half can be used as structural members to create new composite structures.

Tetrahedrons have been used in trusses where a frame composed of structural members along each edge of the tetrahedron result in four vertices and multiple tetrahedrons are attached at their vertices and/or edges to build a strong truss. What has not been recognized is the utility of using the hyperbolic paraboloids which divide a special set of these tetrahedrons in half. The special Correlating Tetrahedrons (CTs) of this application are divided in half by hyperbolic paraboloids whose edge dimensions and spatial arrangement are thus defined by the CT.

Unexpectedly, these CT hyperbolic paraboloids can be utilized to make a multitude of new, unique geometric structures which, in some applications, can be fit together in a joint that has superior interlocking attributes due to the saddle shaped compound curvature of the CT hyperbolic paraboloids. In other applications the hyperbolic paraboloids of the CT can be used to create cellular, repeating lattice or labyrinthal structures. All of the structures of this application effectively harness the superior rigidity resulting from the smooth saddle shaped compound curvature of the CT hyperbolic paraboloids. This curvature results in improved rigidity similar to the improved rigidity that results from a sheet of paper formed into a cylinder which is more rigid than a flat sheet, yet both have the same thickness.

The new technology which is the subject of this application is described in detail below.

SUMMARY

During pursuit of strong, lightweight structures utilizing tetrahedral trusses, the new technology of this application using hyperbolic paraboloids correlated to a special set of tetrahedrons was developed by the applicant and is disclosed herein. The special set of tetrahedrons are termed Correlating Tetrahedrons (CTs) with each, in turn, defining five hyperbolic paraboloids useful in building the unique and unanticipated new structures of this application. The CTs have four identical isosceles triangular faces with two opposite equal length edges designated L2 and four other equal length edges designated L1. The CTs are further defined by requiring an integer number of them to fit around a central axis (4). The six edges of the CT are used in three different combinations to become the four edges of each of three hyperbolic paraboloids. A mathematical equation has been developed such that when followed, the five hyperbolic paraboloids listed in the bullets above are defined for each value of n, n is an integer greater than or equal to 3.

What had not been recognized is the utility of using the hyperbolic paraboloids which divide these special CTs in half as structural members. The resulting hyperbolic paraboloids have edge dimensions and spatial arrangement that are correlated or defined by the special CTs. So correlated, the CT has imbued the hyperbolic paraboloid structural members with the same characteristic dimensions L1 and L2, similar spatial layouts, and when aggregated as n-HyPars or n-HyPar LAs (defined below), the result is a composite structure with the same axial and circumferential vertex separations such that they can be used as inter-connectable structural members. In general benefits of the correlated or related system of hyperbolic paraboloids present themselves wherein sufficient edges, corners and/or faces become spatially coincident when they are placed adjacently to enable three dimensionally stable connections. Because the hyperbolic paraboloid structural members all emanate from the same tetrahedron, they become correlated and this newly discovered attribute is exploited to create a multitude of different composite structures. These correlated hyperbolic paraboloid structural members can also be used as appurtenances of other geometric objects such as square bars, spheres, etc. so that these other geometric objects can also be joined in an interlocking fashion. The interlocking characteristics of these structures result from the saddle shaped compound curvature of the hyperbolic paraboloids.

There are five of these correlated hyperbolic paraboloid structural members, three of which divide the CT in half and half size truncations of two of them (actually, putting two of these half size truncations together can also be used to divide the CT in half). Using some nomenclature that needed to be invented to define and communicate these correlated hyperbolic paraboloid structural members—nomenclature further defined later in this specification—the five correlated hyperbolic paraboloids are;

The L1 hyperbolic paraboloid

The RH L2 or right handed or L2 right L1 hyperbolic paraboloid—a mirror image of the LH L2 hyperbolic paraboloid below The truncated RH L2 hyperbolic paraboloid—a half size truncation of the RH L2 hyperbolic paraboloid The LH L2 or left handed or L2 left L1 hyperbolic paraboloid—a mirror image of the RH L2 hyperbolic paraboloid above The truncated LH L2 hyperbolic paraboloid—a half size truncation of the LH hyperbolic paraboloid Note; the RH L2 and the LH L2 hyperbolic paraboloids are also sometimes referred to as the L2 hyperbolic paraboloids Also there are five categories of structures made possible by correlating the hyperbolic paraboloids structural members above;

The correlated hyperbolic paraboloid structural members can be used individually and are further connectable to other correlated hyperbolic paraboloid structural members or other structures Correlated hyperbolic paraboloid structural members can be joined as pairs forming cells which are further connectable to other correlated hyperbolic paraboloid structural members or other structures The L1 correlated hyperbolic paraboloid structural members can be further aggregated into n-HyPars which can be stacked thus being further connectable to other correlated hyperbolic paraboloid structural members or other structures The L2 correlated hyperbolic paraboloid structural members can be further aggregated into n-HyPar LAs and are further connectable to other correlated hyperbolic paraboloid structural members or other structures The truncated L2 correlated hyperbolic paraboloid structural members can be further aggregated into cells and are further connectable to other correlated hyperbolic paraboloid structural members or other structures A unique characteristic (the ability to be stacked) emerges from the CT correlation for the L1 hyperbolic paraboloids (26) when they are further aggregated as n-HyPars (defined later). Stacking is a process by which the axial vertices of one are placed between two adjacent circumferential vertices of a second, an action that also places the axial vertices of the second between two adjacent circumferential vertices of the first—the hyperbolic paraboloid faces of both now being congruent.

The n-HyPars have the dual characteristics of an integer number of them fitting around a central axis plus the ability to be stacked. Both of these characteristics being available in the same hyperbolic paraboloid led to the discovery and creation of the n-fold hyperbolic paraboloids (n-HyPars), n an integer greater than or equal to 3, of this application. The n-HyPars e.g. FIGS. 2B, 2E, 2N and 2S (20,21,23,25) use the L1 hyperbolic paraboloids which are sized and correlated by a procedure of first placing n CTs around a central axis with the edges of adjacent hyperbolic paraboloids being congruent and secondly constructing the L1 hyperbolic paraboloids between the L1 edges (10) of the CT. The n-HyPars are then subsequently constructed be placing n of them around a central axis with two opposite corners touching the central axis and the L1 edges of adjacent L1 hyperbolic paraboloids are made congruent. These n-HyPars can all be stacked or connected indefinitely at their hyperbolic paraboloid shaped faces.

The 4-fold hyperbolic paraboloid (4-HyPar) of FIG. 2E (21) has the special attribute of being space filling. Like the cube, the 4-HyPars can be continuously stacked so that they completely enclose a volume, there is no unenclosed volume between them and there are no gaps or overlaps. The 4-HyPars can then be used to construct commonly used structural shapes such as bars, planar arrays, I beams, L beams, channel beams and box beams FIGS. 2F, 2G, 2H, 2J, 2K, 2L, 2M (57, 58, 60, 62, 64, 66). All of the n-HyPars can be further connected to themselves or other correlated hyperbolic paraboloid structural members.

The n-fold hyperbolic paraboloid lattice assemblies (n-HyPar LAs) e.g. FIG. 3C (48) of this application use the L2 hyperbolic paraboloids (50, 52) which are sized and correlated by a procedure of first placing n CTs around a central axis with the edges of adjacent hyperbolic paraboloids being congruent and secondly constructing the L2 hyperbolic paraboloid structural members between the two L2 edges (14) and two of the four L1 edges (10) of the CT. The n-HyPar LAs are then subsequently constructed by placing n L2 hyperbolic paraboloids around a central axis with one L2 edge on the central axis. Actually an n-HyPar LA can be formed from any combination of the L1 and the L2 hyperbolic paraboloid structural members with the exception of having all L1 hyperbolic paraboloids which would make it an n-HyPar. Although the n-HyPar LAs don't completely enclose an internal volume like the n-HyPars do, the resulting assembly can be made to be periodic throughout space and they have a unique characteristics wherein, at the mid-plane between the axial vertices, a polygon of n equal sides results. All of the n-HyPar LAs can be further connected to themselves or other correlated hyperbolic paraboloids.

The correlated hyperbolic paraboloid cells are created by joining two correlated hyperbolic paraboloids such that they form a closed portion and an opening i.e. a cell. The n=4 L1 hyperbolic paraboloid cell (69) has the especially useful attribute of the cell opening forming a rhombus with two opposite angles of 60 degrees and the other two opposite angles being 120 degrees. These cells can then be used to construct further composite structures such as the 4-HyPar FIG. 2E (7), a linear cellular structure with a triangular cross section FIG. 4B (28), a hyperbolic paraboloid rhombohedron FIG. 4D (74), and a hyperbolic rhombic dodecahedron FIG. 4E (76) amongst other cellular assemblies. All of the hyperbolic paraboloid cells can be further connected to themselves or other correlated hyperbolic paraboloid structural members.

The L2 hyperbolic paraboloids can also be truncated such that they have two half-length L2 edges, one L1 edge connecting one end of each half-length L2 edge with the other and a fourth edge between the midpoints of the L2 edges. These truncated L2 hyperbolic paraboloids can be used to create cellular structures e.g. FIGS. 3F, 3G, and 3H and they can be further connected to themselves or other correlated hyperbolic paraboloid structural members.

The L1, L2, and truncated L2 hyperbolic paraboloids can also be used in combination to construct repeating cellular, lattice and labyrinthal structures which effectively harness material properties to result in a structure with inherent strength, rigidity and lightweight properties due to the hyperbolic paraboloid shape of the composite stricture walls. The L1 and L2 hyperbolic paraboloids can also be used in toys FIG. 4F as well as having uses wherein they can be applied as appurtenances to other geometric objects such as square bars FIG. 4L (56), spheres, etc. such that these other geometric objects can be joined in an interlocking fashion or connected to other correlated hyperbolic paraboloid structural members.

The above newly invented method for sizing and correlating the hyperbolic paraboloid structural members is unique and useful. As discussed above, the method results in requiring n, L1 and L2 to conform to a mathematical equation which has been derived by the applicant and is further explained later in this specification. Sizing and correlating hyperbolic paraboloid structural members using the CT and conforming to this equation allows the five different correlated hyperbolic paraboloid structural members listed above to be created for each value of n, n an integer greater than or equal to three and to be inter-connectable to each other.

The use of the correlated hyperbolic paraboloid structural members of this application results in a surprising variety and a multitude of composite structures. Structures that are solid, cellular, repeating lattice and labyrinthal are available. The structures of this application are material efficient, strong and rigid due to the inherent shape, strength and rigidity of a hyperbolic paraboloid.

DRAWINGS

Figures

In the drawings, closely related figures have the same number but different alphabetic suffixes. Also when referring to a hidden edge or surface, dashed leaders to the reference numerals are used. In some Figures to help illustrate the hyperbolic paraboloids, the convention is adopted whereby the portion of the hyperbolic paraboloid below the plane of the paper is dashed whereas the portion above the plane of the paper is shown in solid lines.

Figure 1A:
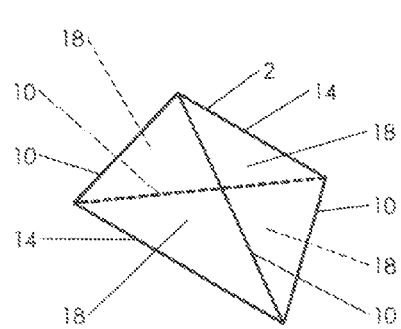
FIG. 1A depicts the Correlating Tetrahedron (CT) with two opposite edges of equal length, L2, and the remaining four edges being of equal length, L1, resulting in a tetrahedron with four identical isosceles triangular faces. By definition a CT is a tetrahedron wherein an integer number of them fit around a central axis with no gaps or overlaps.
Figure 1B:
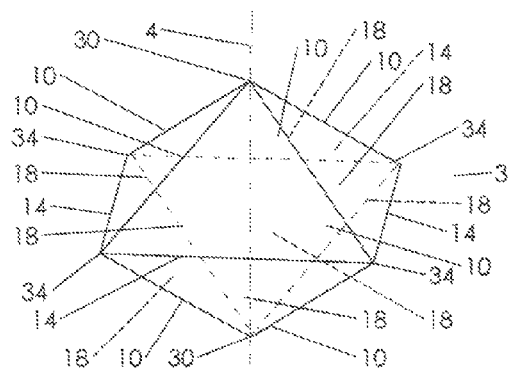
FIG. 1B illustrates four CTs arranged around a central axis each CT having one of their L2 edges on the central axis and the others forming a mid-plane polygon. It shows a square dipyramid with each edge forming the mid-plane polygon (in this case a square) being equal to the length of the central axis of the dipyramid.
Figure 1C:
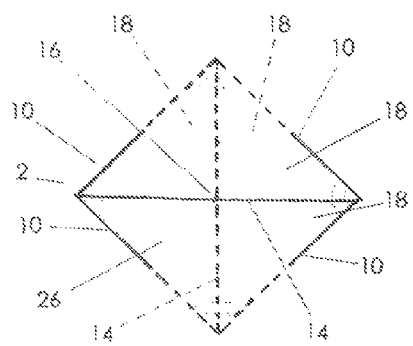

FIG. 1C depicts the CT in a special orientation with the two opposite edges of length L2 appearing to cross at their midpoints and illustrating the square profile of all CTs of this application from this perspective. Also illustrated is an L1 hyperbolic paraboloid inside the CT showing that this hyperbolic paraboloid has four L1 edges. It is oriented such that the view is looking down the perpendicular line at the zero curvature center point of the hyperbolic paraboloid—this perpendicular line passes through the two L2 edges at their center points.

Figure 1D:
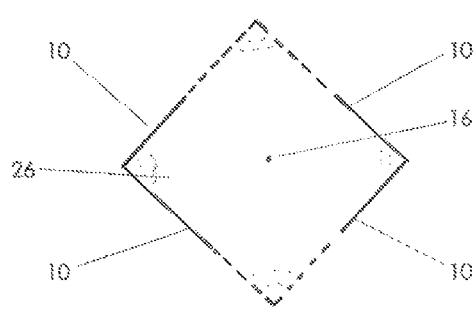

FIG. 1D depicts the L1 hyperbolic paraboloid outside the CT showing that from this perspective, (looking down the perpendicular line at the zero curvature center point), it has a square profile.

Figure 1E:
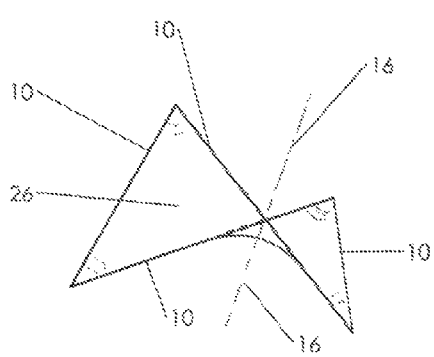

FIG. 1E is a perspective view of an L1 hyperbolic paraboloid.

Figure 1F:
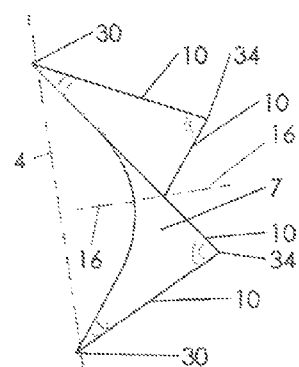

FIG. 1F is a perspective view of how one L1 hyperbolic paraboloid interfaces with the central axis of an n-fold hyperbolic paraboloid (n-HyPar) and in this case the dipyramid of FIG. 1B.

Figure 1G:
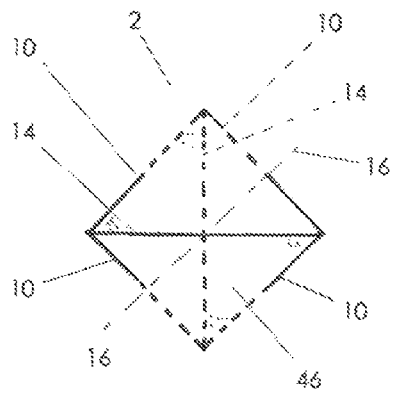

FIG. 1G depicts the L2 right L1 hyperbolic paraboloid inside the CT.

Figure 1H:
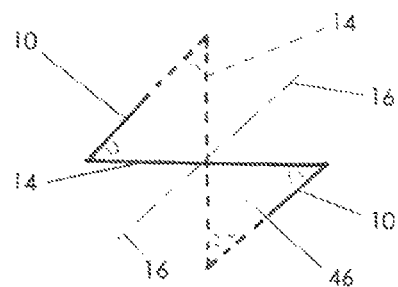

FIG. 1H depicts the L2 right L1 hyperbolic paraboloid outside the CT.

Figure 1J:
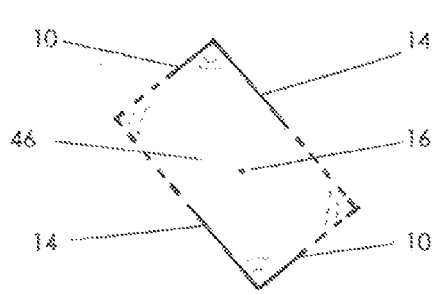

FIG. 1J illustrates that, when viewed down the perpendicular line at the zero curvature center point, the L2 right L1 hyperbolic paraboloid has a rectangular profile.

Figure 1K:
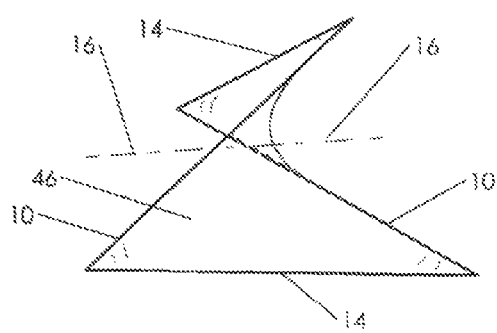

FIG. 1K is a perspective view of an L2 right L1 hyperbolic paraboloid.

Figure 1L:
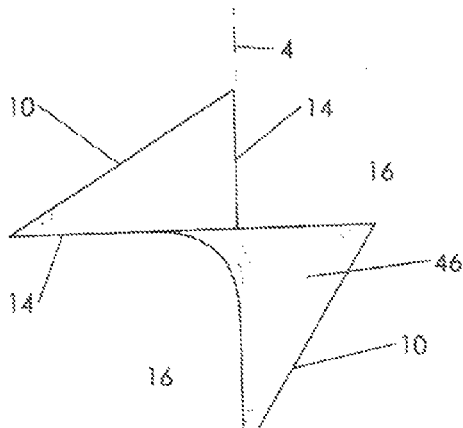

FIG. 1L is a perspective view of an L2 right L1 hyperbolic paraboloid as it would interface with the central axis of an n-fold hyperbolic paraboloid lattice assembly (n-HyPar LA)

Figure 1M:
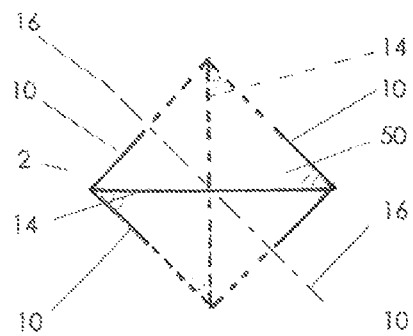

FIG. 1M depicts the L2 left L1 hyperbolic paraboloid inside the CT.

Figure 1N:
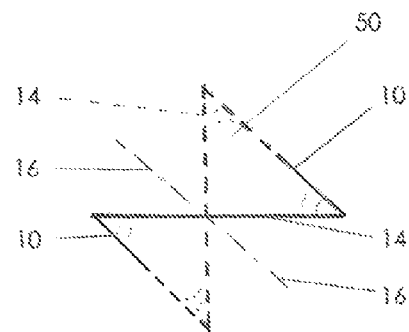

FIG. 1N depicts the L2 left L1 hyperbolic paraboloid outside the CT.

Figure 1P:
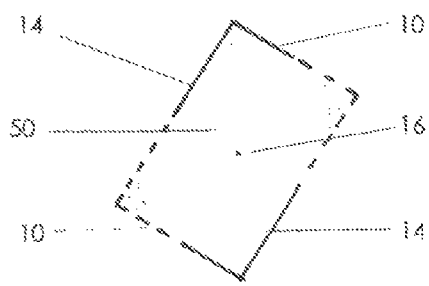

FIG. 1P illustrates that, when viewed down the perpendicular line at the zero curvature center point, the L2 left L1 hyperbolic paraboloid has a rectangular profile.

Figure 1Q:
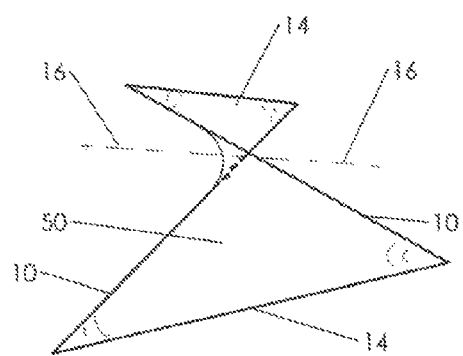

FIG. 1Q is a perspective view of an L2 left L1 hyperbolic paraboloid.

Figure 1R:
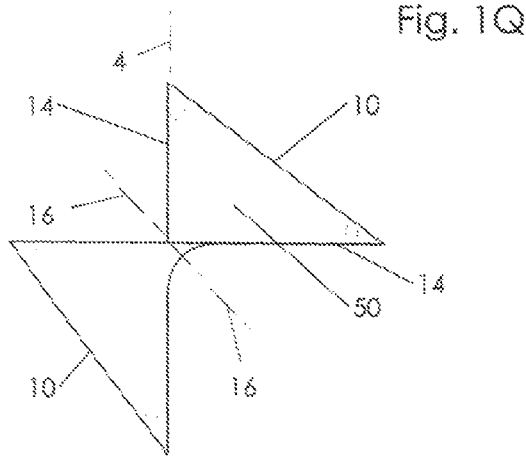

FIG. 1R is a perspective view of an L2 left L1 hyperbolic paraboloid as it would interface with the central axis of an n-fold hyperbolic paraboloid lattice assembly (n-HyPar LA)

Figure 2A:
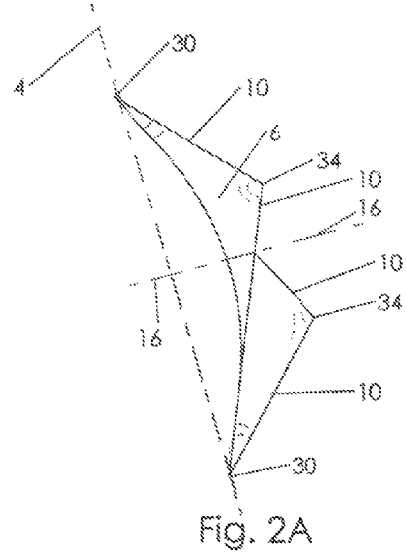

FIG. 2A illustrates how two opposite corners of each n=3, L1 hyperbolic paraboloid touches the central axis of a 3-fold hyperbolic paraboloid (3-HyPar).

Figure 2B:
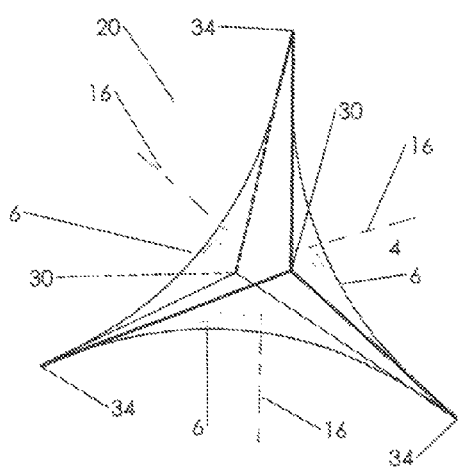

FIG. 2B illustrates how three, n=3, L1 hyperbolic paraboloids are placed around a central axis with their adjacent edges congruent creating the 3-fold hyperbolic paraboloid (3-HyPar).

Figure 2C:
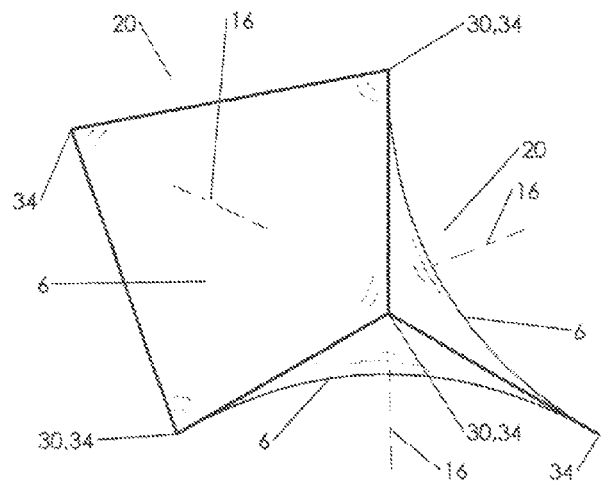

FIG. 2C shows the structure created when two, 3-hypars are joined together and the figure also illustrates the alternating orientation of the axial vertices between adjacent 3-hypars and that the two axial vertices of one mate with two circumferential vertices of the other.

Figure 2D:
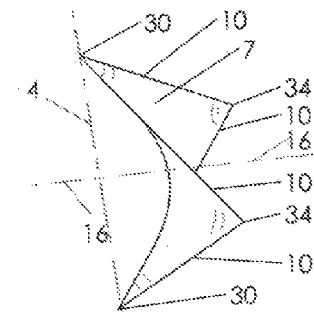

FIG. 2D illustrates how two opposite corners of each n=4, L1 hyperbolic paraboloid touches the central axis of a 4-fold hyperbolic paraboloid (4-HyPar).

Figure 2E:
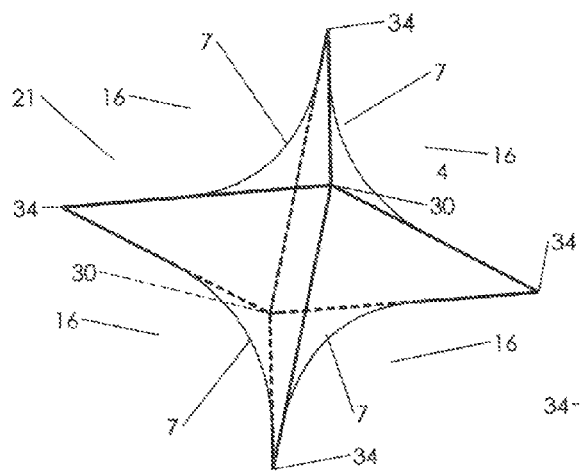

FIG. 2E illustrates how four, n=4, L1 hyperbolic paraboloids are placed around a central axis with their adjacent edges congruent creating the 4-fold hyperbolic paraboloid (4-HyPar).

Figure 2F:
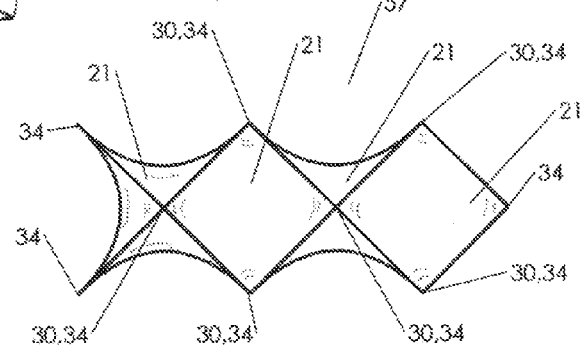

FIG. 2F shows the structure (a bar) created when four, 4-HyPars are joined together at their hyperbolic paraboloid faces and illustrates the alternating orientation of the axial vertices between adjacent 4-HyPars and that the two axial vertices of one mate with two circumferential vertices of another.

Figure 2G:
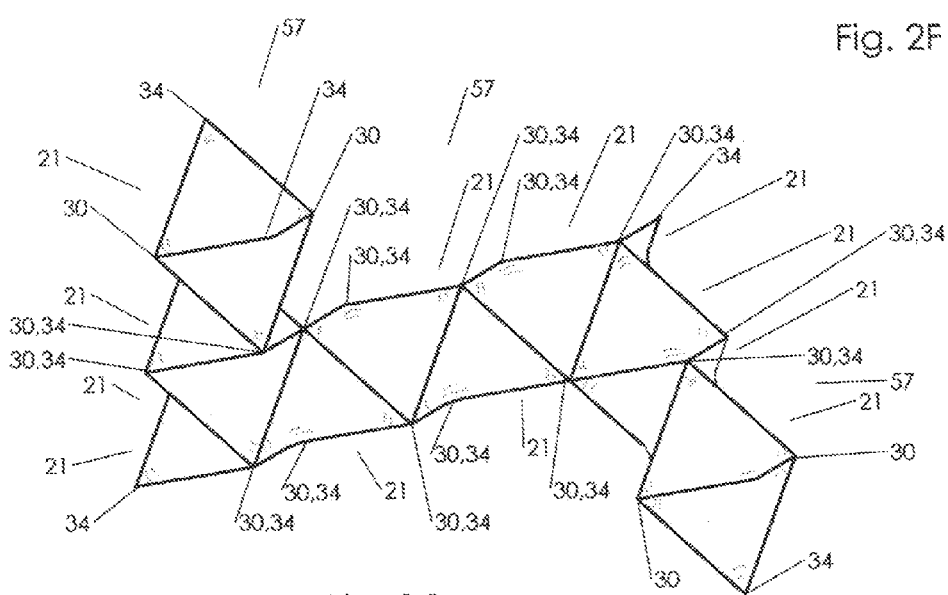

FIG. 2G shows the structure created when twelve (3 bars), 4-HyPars are joined together at selected hyperbolic paraboloid faces and illustrates the alternating orientation of the axial vertices between adjacent 4-hypars and that the two axial vertices of one mate with two circumferential vertices of another. It also illustrates the 4-HyPars stacked to extend into all three spatial dimensions.

Figure 2H:
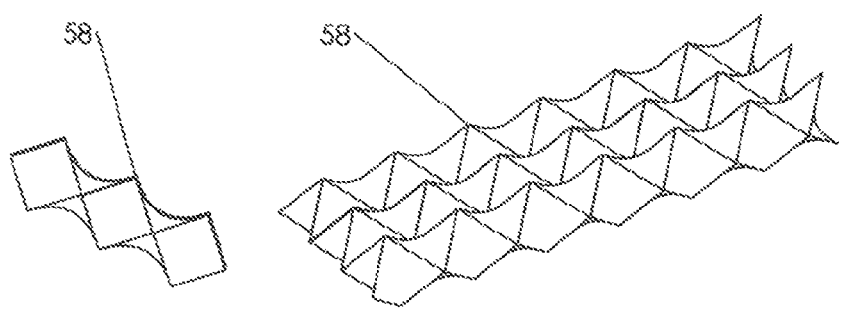

FIG. 2H is a cross sectional and a perspective view of a structural member, a planar array, composed of 4-HyPars joined at selected hyperbolic paraboloid faces.

Figure 2J:
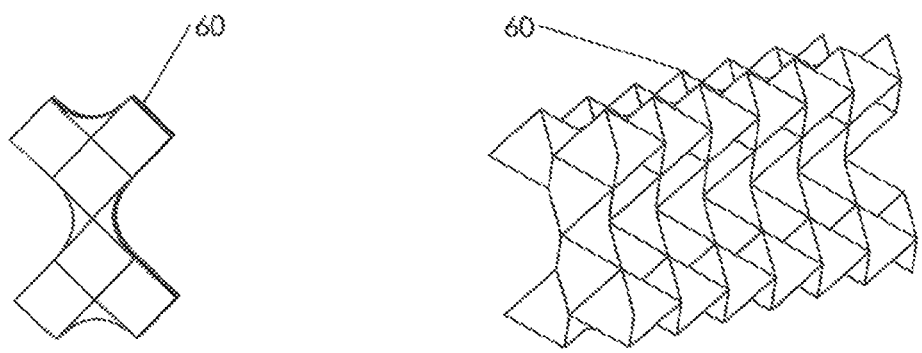

FIG. 2J is a cross sectional and a perspective view of a structural member, an I beam, composed of 4-HyPars joined at selected hyperbolic paraboloid faces.

Figure 2K:
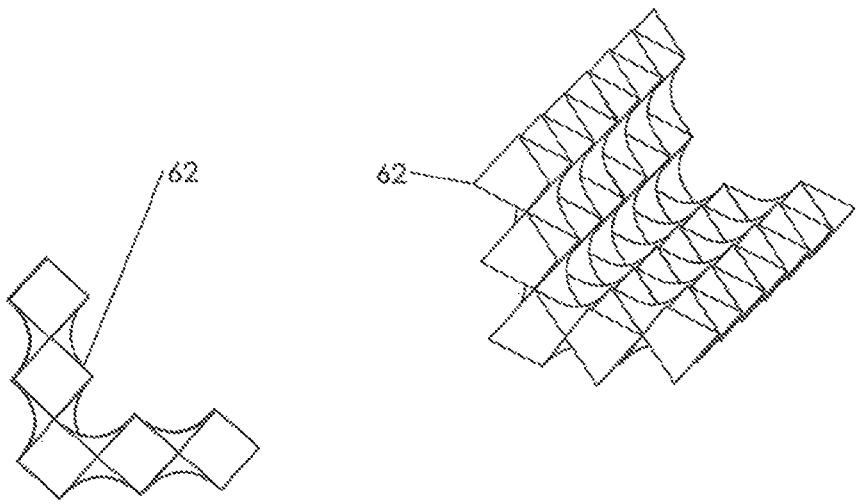

FIG. 2K is a cross sectional and a perspective view of a structural member, an L beam, composed of 4-HyPars joined at selected hyperbolic paraboloid faces.

Figure 2L:
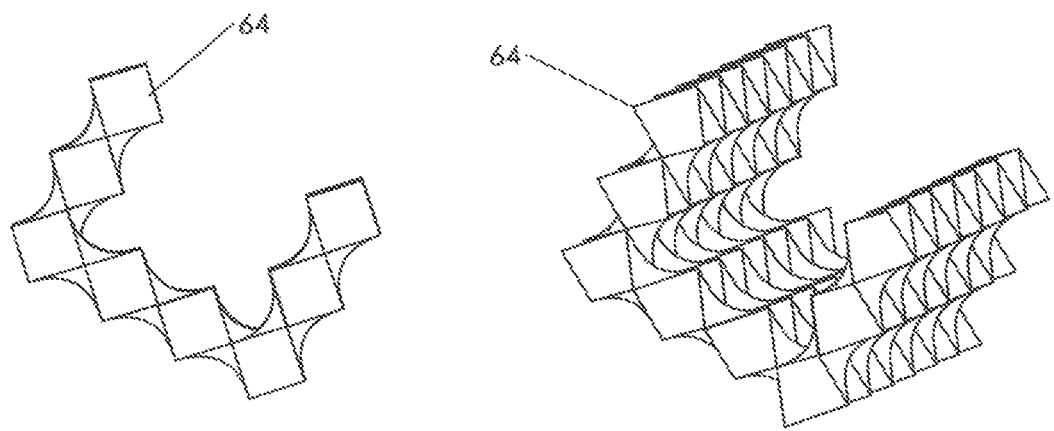

FIG. 2L is a cross sectional and a perspective view of a structural member, a channel beam, composed of 4-HyPars joined at selected hyperbolic paraboloid faces.

Figure 2M:
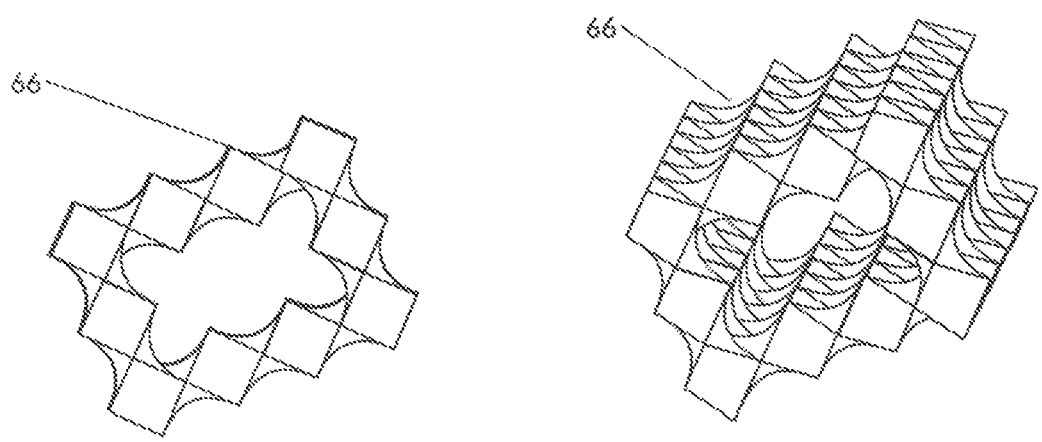

FIG. 2M is a cross sectional and a perspective view of a structural member, a box beam, composed of 4-HyPars joined at selected hyperbolic paraboloid faces.

Figure 2N:
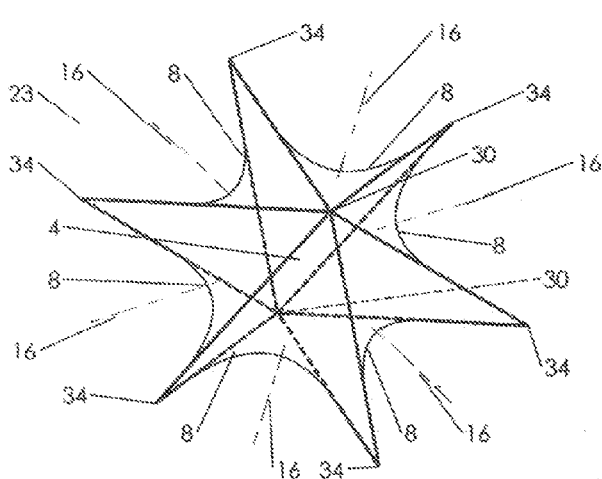

FIG. 2N illustrates how six, n=6, L1 hyperbolic paraboloids are placed around a central axis with their adjacent edges congruent creating the 6-fold hyperbolic paraboloid (6-HyPar).

Figure 2P:
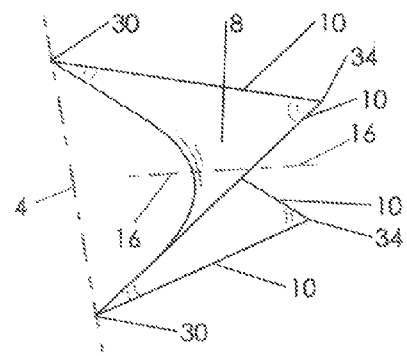

FIG. 2P illustrates how two opposite corners of each n=6, L1 hyperbolic paraboloid touches the central axis of a 6-fold hyperbolic paraboloid (6-HyPar).

Figure 2Q:
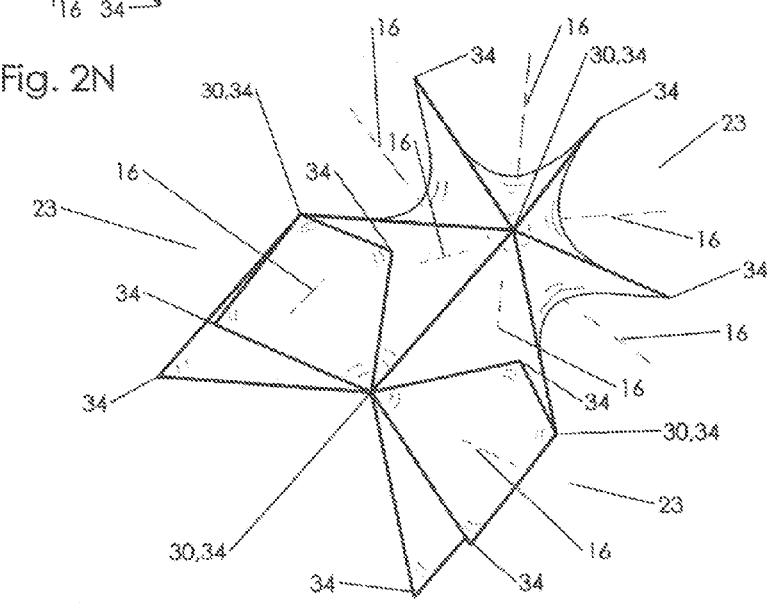

FIG. 2Q shows the structure created when three, 6-HyPars are joined together and illustrates the alternating orientation of the axial vertices between adjacent 6-HyPars and that the two axial vertices of one mate with two circumferential vertices of another.

Figure 2R:
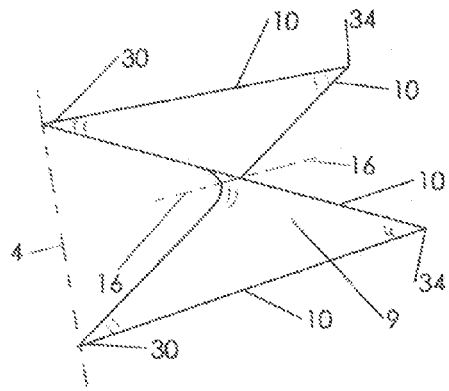

FIG. 2R illustrates how two opposite corners of each n=8, L1 hyperbolic paraboloid touches the central axis of an 8-fold hyperbolic paraboloid (8-HyPar).

Figure 2S:
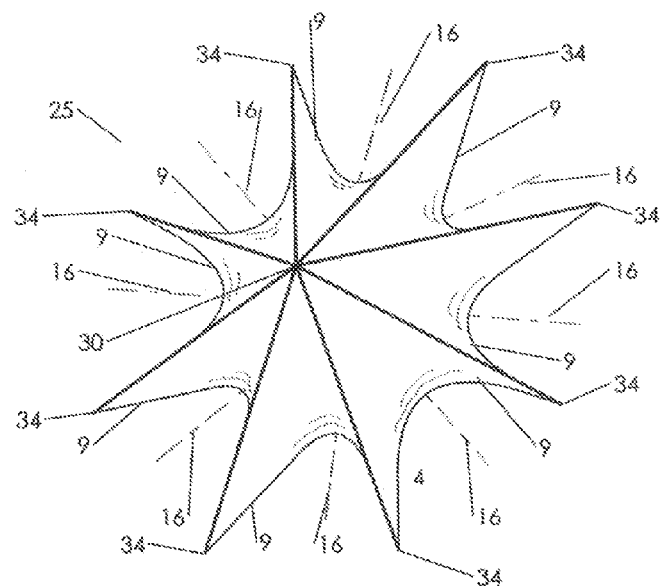

FIG. 2S illustrates how eight, n=8, L1 hyperbolic paraboloids are placed around a central axis with their adjacent edges congruent creating the 8-fold hyperbolic paraboloid (8-HyPar).

Figure 2T:
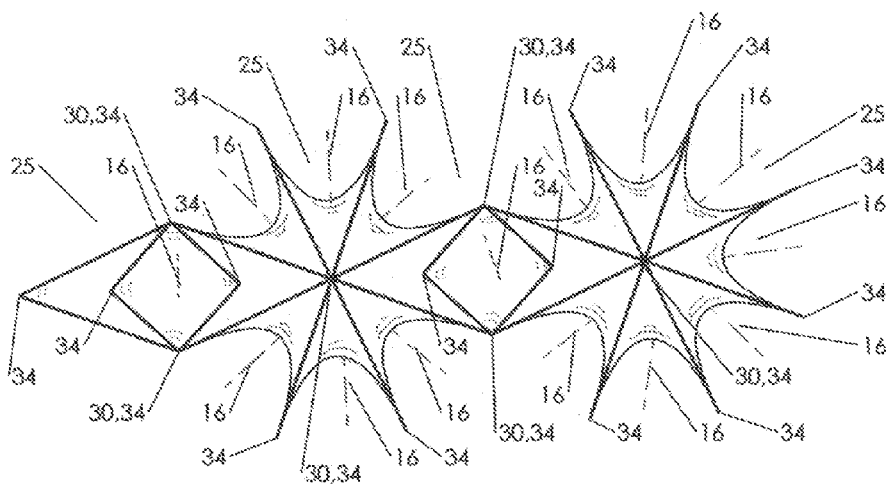

FIG. 2T shows the structure created when four, 8-HyPars are joined together and illustrates the alternating orientation of the axial vertices between adjacent 8-hypars and that the two axial vertices of one mate with two circumferential vertices of another.

Figure 3A:
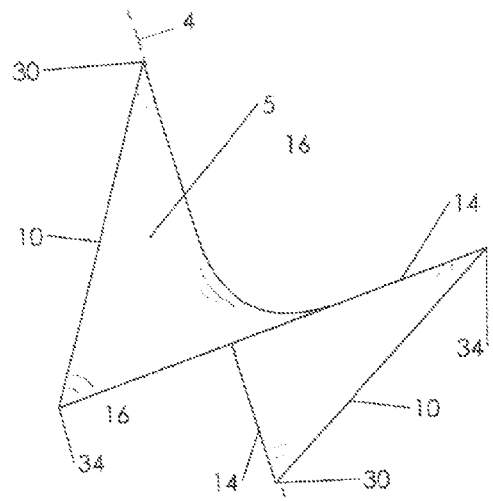

FIG. 3A illustrates the L2 right L1 hyperbolic paraboloid.

Figure 3B:
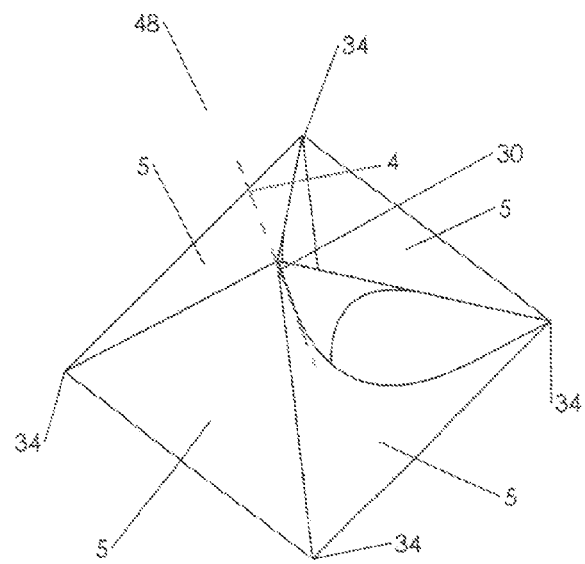

FIG. 3B shows a structure created when four of the n=4, L2 right L1 hyperbolic paraboloids are arranged around a central axis and joined in an assembly (the 4-HyPar LA). It also illustrates the square profile at the mid-plane as expected for the n=4 L2 right L1 hyperbolic paraboloid.

Figure 3C:
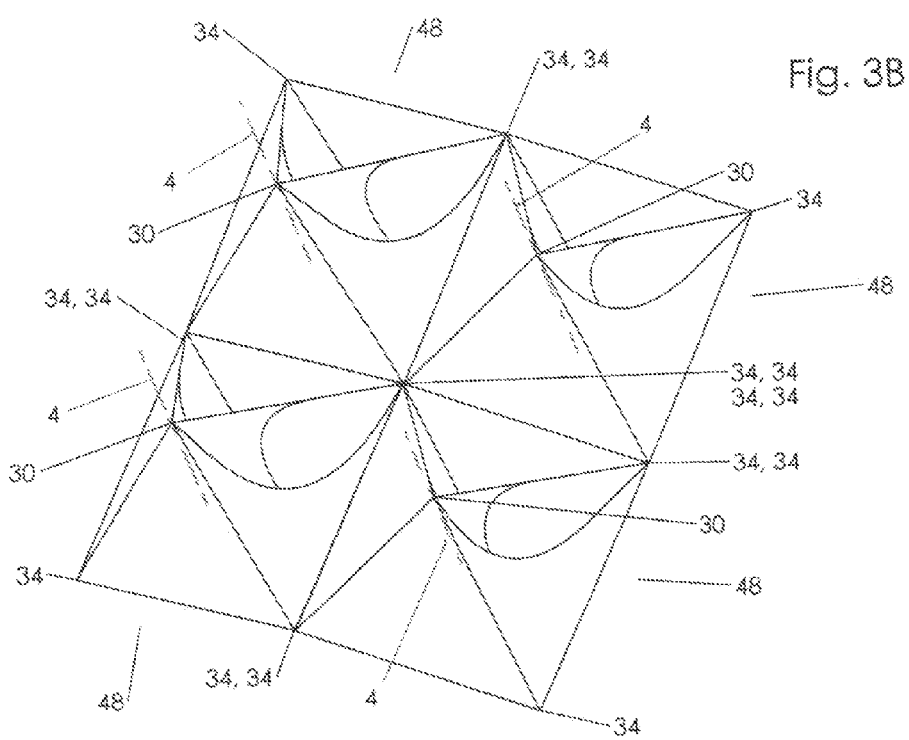

FIG. 3C illustrates the structure created when four of the assemblies of FIG. 3B (4-HyPar LAs) are joined at their mid-planes illustrating how they are arranged in a layer that can be extended indefinitely in that plane. Note that another assembly of FIG. 3B (the 4-HyPar LAs) can be placed with its central axis at this arrangements' mid-point starting another repeating layer above the first. This process of adding new layers can be repeated indefinitely.

Figure 3D:
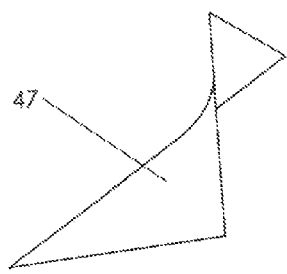

FIG. 3D is a truncated L2 right L1 hyperbolic paraboloid. The lower right or upper left portion of the L2 right L1 hyperbolic paraboloid of FIG. 1H also illustrates this truncated L2 right L1 hyperbolic paraboloid from a different perspective.

Figure 3E:
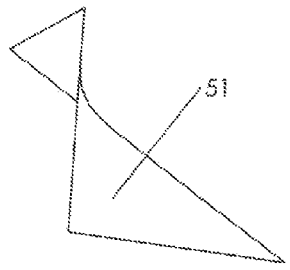

FIG. 3E is a truncated L2 left L1 hyperbolic paraboloid. The lower left t or upper right portion of the L2 left L1 hyperbolic paraboloid of FIG. 1N also illustrates this truncated L2 left L1 hyperbolic paraboloid from a different perspective.

Figure 3F:
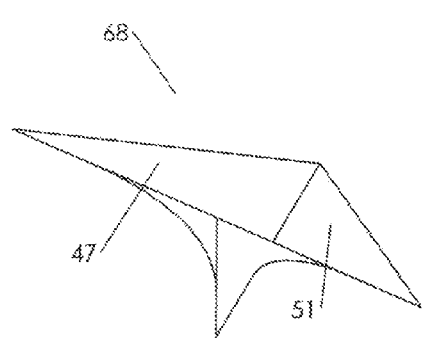

FIG. 3F depicts a truncated L2 right L1 hyperbolic paraboloid connected at selected edges to a truncated L2 left L1 hyperbolic paraboloid to form a truncated L2 hyperbolic paraboloid cell.

Figure 3G:
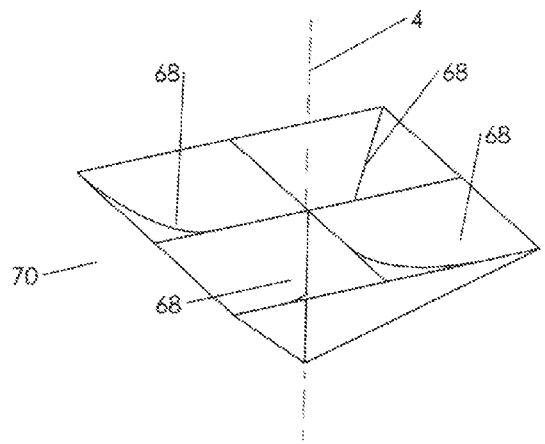

FIG. 3G illustrates how four of the FIG. 3F truncated L2 hyperbolic paraboloid structures can be connected at selected edges around a central axis to form a cellular structure.

Figure 3H:
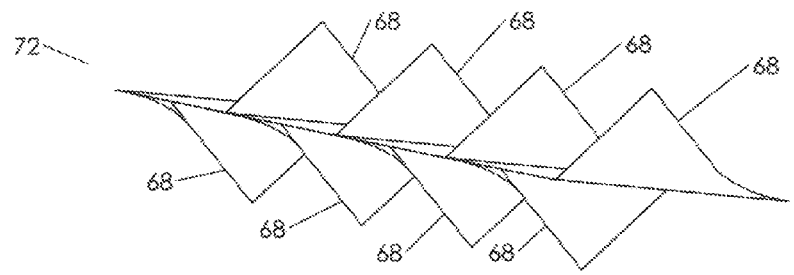

FIG. 3H illustrates how eight of the FIG. 3F truncated L2 hyperbolic parabo9loid structures can be connected at selected edges to form a linear cellular structure.

Figure 4B:
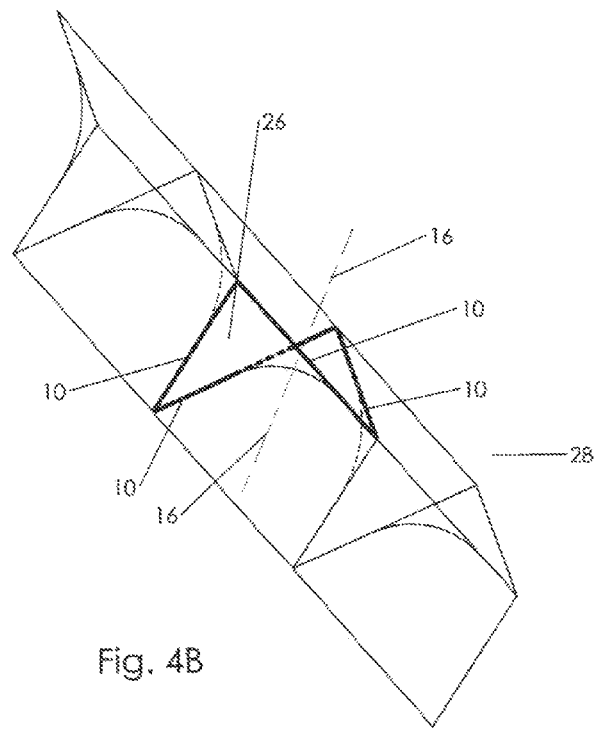
Figure 4A:
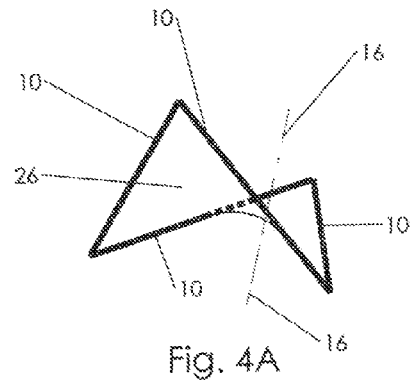

FIG. 4A illustrates a perspective view of the n=4, L1 hyperbolic paraboloid.

FIG. 4B illustrates the n=4, L1 hyperbolic paraboloid oriented in the same perspective of FIG. 4B and shows it amidst many other similar hyperbolic paraboloids creating a composite cellular structure of n=4, L1 hyperbolic paraboloids.

Figure 4C:
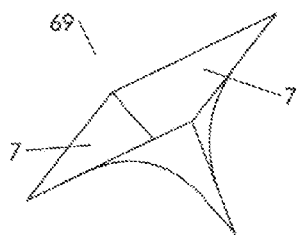

FIG. 4C illustrates an n=4 hyperbolic paraboloid cell with a rhombic cell opening with two 60 degree and two 120 degree angles.

Figure 4D:
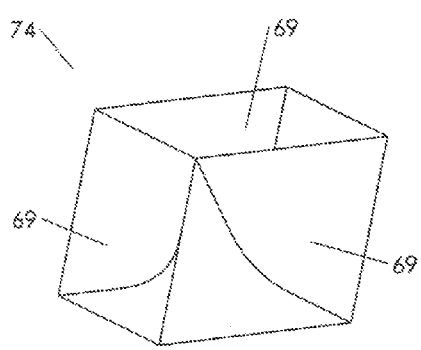

FIG. 4D illustrates a hyperbolic paraboloid rhombohedron composed of n=4 L1 hyperbolic paraboloid cells wherein the edges are congruent with the edges of the traditional rhombohedron.

Figure 4E:
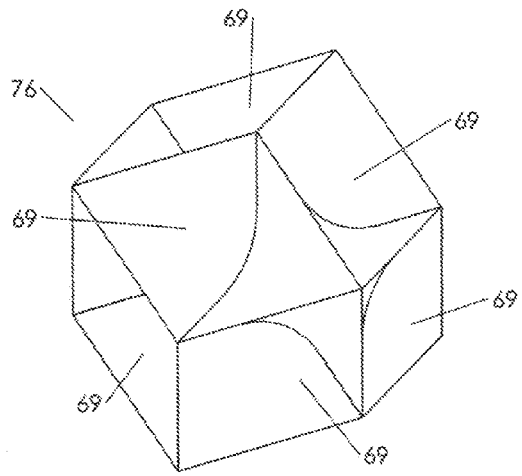

FIG. 4E illustrates a hyperbolic paraboloid rhombic dodecahedron composed of n=4 L1 hyperbolic paraboloid cells wherein the edges are congruent with the edges of the traditional rhombic dodecahedron.

Figure 4F:
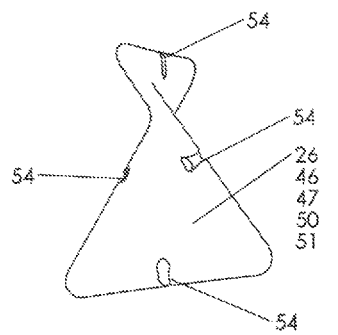

FIG. 4F illustrates one example of how the five CT hyperbolic paraboloids can be used as toys by placing attachment features at each edge to mate with a connector.

Figure 4G:
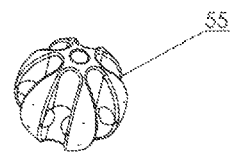

FIG. 4G is a connector for use with the toys of FIG. 4F.

Figure 4H:
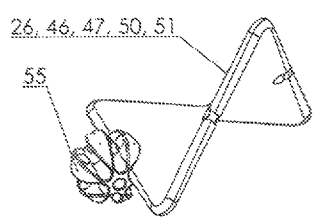

FIG. 4H illustrates the connector of FIG. 4G attached to the toy of FIG. 4E.

Figure 4J:
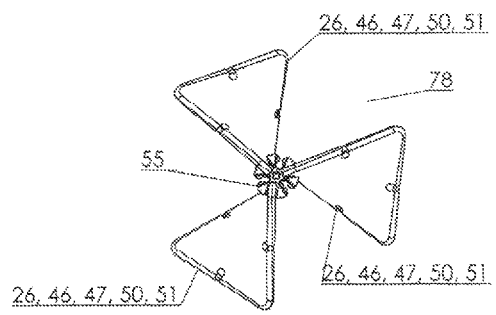

FIG. 4J illustrates a toy three bladed propeller.

Figure 4K:
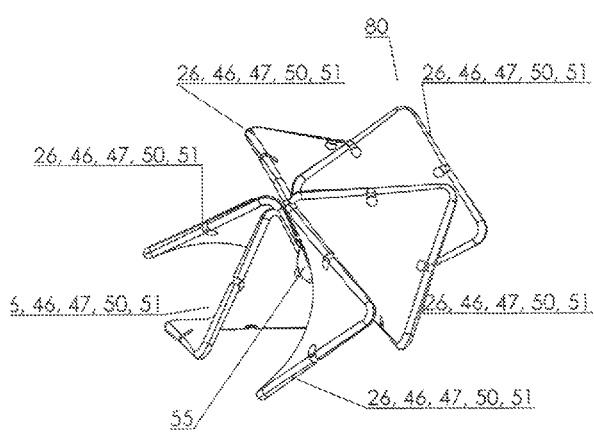

FIG. 4K illustrates a toy six bladed propeller.

Figure 4L:
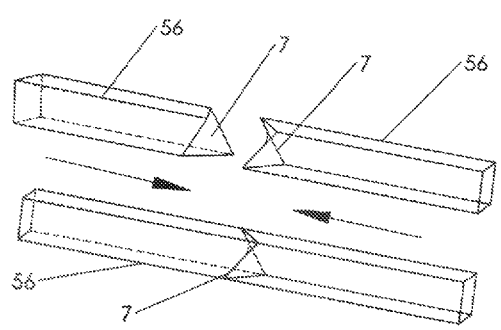

FIG. 4L shows two square bars which have had an end shaped like an L1 hyperbolic paraboloid being joined at the hyperbolic paraboloid surfaces showing how the square bars become interlocked by this procedure.

REFERENCE NUMERALS

2 Correlating Tetrahedron (CT)
3 Square dipyramid composed of four n=4. CTs
4 Central axis
5 n=4, L2 right L1 hyperbolic paraboloid
6 n=3, L1 hyperbolic paraboloid
7 n=4, L1 hyperbolic paraboloid
8 n=6, L1 hyperbolic paraboloid
9 n=8, L1 hyperbolic paraboloid
10 L1 CT edge
14 L2 CT edge
16 Perpendicular line at the zero curvature center point of the hyperbolic paraboloid surface.
18 CT isosceles triangle consisting of one L2 edge and two L1 edges of equal length.
20 Three-fold hyperbolic paraboloid (3-HyPar)
21 Four-fold hyperbolic paraboloid (4-HyPar)
23 Six-fold hyperbolic paraboloid 6-HyPar)
25 Eight-fold hyperbolic paraboloid (8-HyPar)
26 L1 hyperbolic paraboloid
28 Linear cellular structure with a triangular cross section using the n=4 L1 hyperbolic paraboloid cells
30 Axial vertex
34 Circumferential vertex
46 L2 right L1 hyperbolic paraboloid
47 Truncated L2 right L1 hyperbolic paraboloid
48 n=4, L2 right L1 n-fold hyperbolic paraboloid lattice assembly (4-HyPar LA)
50 L2 left L1 hyperbolic paraboloid
51 Truncated L2 left L1 hyperbolic paraboloid
52 L2 left L1 n-fold hyperbolic paraboloid lattice assembly (n-HyPar LA)
54 Attachment features for use as a toy
55 Toy connector
56 Square Bar
57 A bar shaped structural member composed of 4-HyPars
58 A planar array shaped structural member composed of 4-HyPars
60 An I beam structural members composed of 4-HyPars
62 An L beam shaped structural member composed of 4-HyPars
64 A channel beam shaped structural member composed of 4-HyPars
66 A box beam shaped structural member composed of 4-HyPars 68 A truncated hyperbolic paraboloid cell with an L2 right L1 hyperbolic paraboloid joined at selected edges to a truncated L1 left hyperbolic paraboloid 69 n=4 L1 hyperbolic paraboloid cell using two of the n=4 L1 hyperbolic paraboloids 70 Four truncated L2 hyperbolic paraboloid cells joined at selected edges to a central axis and to each other to form a cellular structure 72 Eight truncated L2 hyperbolic paraboloid cells joined at selected edges to each other to form a linear cellular structure 74 Hyperbolic paraboloid rhombohedron with edges congruent with the edges of the traditional rhombohedron 76 Hyperbolic paraboloid rhombic dodecahedron with edges congruent with the edges of the traditional rhombic dodecahedron 78 Toy three bladed propeller 80 Toy six bladed propeller

DETAILED DESCRIPTION

A three step process is used to create sets of unexpectedly and extensively useful hyperbolic paraboloids. One particular member of each set can be combined to form the n-Fold Hyperbolic Paraboloids (discussed and shown later) and is especially unique and is composed of n of these hyperbolic paraboloids arranged around a common central axis with one of its L2 edges (defined later) on that central axis, with their edges congruent and with no gaps or overlaps. These have special attachment features whereby they can be connected at the faces of the n-Fold Hyperbolic Paraboloids. The other members of each set are hyperbolic paraboloids imbued with the specific dimensional characteristics to make them so extensively inter-connectable.

In the first step of the process, a tetrahedron is specifically dimensioned to have two opposite edges of length L2 and four other edges of length L1. In the second step, this tetrahedron is specifically sized by requiring it to conform to a mathematical equation developed by the applicant (more on this equation later in this section) which allows only specific ratios of L1/L2. In the third step, this specifically sized tetrahedron is used to correlate a set of hyperbolic paraboloids and has thus become what is referred to as the correlating tetrahedron in this application. The correlation is accomplished by constructing the four sided hyperbolic paraboloids between the three different combinations of four (of the six edges) of the correlating tetrahedron. The correlated hyperbolic paraboloids thus created have four linear edges. This correlating step imbues the resulting hyperbolic paraboloids with unique characteristic dimensions which completely defines them i.e., their size and curvatures.

The above three step process, when followed creates five correlated hyperbolic paraboloids (one for each of the three edge combinations just mentioned plus an additional two resulting from truncation of two of those three), which have the necessary compatible edges, corners and faces for extraordinarily extensive inter-connection possibilities. There is no theoretical limit to the number of different structures that can be built by joining the correlated hyperbolic paraboloids of this application.

The equation developed by the applicant and the five correlated hyperbolic paraboloids (five for each value of n) that result from the above three step process follows:

The equation is;

$$\frac{L1}{L2} = \frac{\left[1 + \left(\frac{1}{\sin\frac{360°}{2n}}\right)^2\right]^{\frac{1}{2}}}{2}$$

In this equation;

1. n is an integer ≥3 and it is the number of correlating tetrahedrons that can fit around a central axis each tetrahedron having one of its L2 (defined below) edges on the central axis, with edges congruent and with no gaps or overlaps between the correlating tetrahedrons (see FIG. 1B).

2. The correlating tetrahedron (FIG. 1A) has two opposite edges of equal length designated L2 and the remaining four edges also being of equal length, designated L1, L1 not equal to L2. This results in the correlating tetrahedron having four faces which are identical isosceles triangles with one edge of the triangle being of length L2 and the two equal edges being of length L1.

3. L1 and L2 (and specific fractions of L2) are characteristic lengths of the hyperbolic paraboloids and their numerical values define the size and curvatures of the hyperbolic paraboloids.

4. Five hyperbolic paraboloids which have characteristic lengths of L1 and L2 (or partial L2 lengths) imbued onto them by virtue of the fact they are constructed between four (of the six) edges of the correlating tetrahedron thereby adopting its exact edge lengths (half L2 edge lengths are used in two of the five) and opposite corner gap lengths. These five hyperbolic paraboloids are enumerated and further described below;

a. The L1 hyperbolic paraboloid which has all four edges of length L1 and the gap between opposite corners is of length L2.

b. The L2 right L1 hyperbolic paraboloid which has two opposite edges of length L2 and the other two opposite edges of length L1 where the L1 edges emanate from the connection with the L2 edges in a right handed sense (analogous to a right handed helix or screw) and with the gap between opposite corners being of length L1. This hyperbolic paraboloid is the mirror image of the one in d. below.

c. The truncated L2 right L1 hyperbolic paraboloid which is half the L2 right L1 hyperbolic paraboloid above. The two opposite L2 edges are cut in half, thus having length $$\frac{L2}{2},$$

with the cut ends then connected to make the fourth edge of this truncated L2 right L1 hyperbolic paraboloid. This fourth edge is of length $$\frac{L}{2\tan\frac{360}{2n}}.$$

The distance between opposite corners is $$\frac{L}{2\tan\frac{360}{2n}}.$$

This hyperbolic paraboloid is the mirror image of the one in e. below.

d. The L2 left L1 hyperbolic paraboloid which has two opposite edges of length L2 and the other two opposite edges of length L1 where the L1 edges emanate from the connection with the L2 edges in a left handed sense (analogous to a left handed helix or screw) and with the gap between opposite corners being of length L1. This hyperbolic paraboloid is the mirror image of the one in b. above.

e. The truncated L2 left L1 hyperbolic paraboloid which is half the L2 left hyperbolic paraboloid above. The two opposite L1 edges are then cut in half, thus having length $$\frac{L2}{2},$$

with the cut ends then connected to make the fourth edge of this truncated L2 left L1 hyperbolic paraboloid. This fourth edge is of length $$\frac{L}{2\tan\frac{360}{2n}}.$$

The distance between opposite corners is $$\frac{L}{2\tan\frac{360}{2n}}.$$

This hyperbolic paraboloid is the mirror image of the one in c. above.

When a correlating tetrahedron is defined having two opposite edges of length L2 and the remaining four edges being of length L1, the L1 Hyperbolic Paraboloid (item a. in the list above) has a square profile when viewed down the perpendicular line at its zero curvature center point. This square profile is important as it allows the n-Fold Hyperbolic Paraboloids which are constructed by placing n of the 1.1 Hyperbolic Paraboloids around a common central axis each having one of its L2 edges on the centerline, with their edges congruent and with no gaps or overlaps, to be inter-connectable at their faces (FIGS. 2A through 2T).

When a correlating tetrahedron is defined having two opposite edges of length L2 and the remaining four edges being of length L1 and when in conformance with the mathematical equation, a set of characteristic lengths can be established for each integer value of n. These characteristic lengths are L1 and L2 (and in the two truncated hyperbolic paraboloids, other characteristic lengths of $$\left(\text{and in the two truncated hyperbolic paraboloids,}\right.$$

$$\left.\text{other characteristic lengths of }\frac{L2}{2},\frac{L2}{2\tan\frac{360}{2n}}\text{ or }\frac{L2}{2\sin\frac{360}{2n}}\right).$$

The characteristic lengths are all either L1, L2 or a specific fraction of L2 and they completely define the four sided correlated hyperbolic paraboloids i.e., their size and curvatures. To specifically and definitely claim the technology of this application, the equation itself and the five correlated hyperbolic paraboloids are stated appropriately in the Claims.

Overarching Aspects

FIGS. 1A Through 1R

During pursuit of strong, lightweight structures utilizing tetrahedral trusses, the new technology of this application using hyperbolic paraboloids correlated to a special set of tetrahedrons was developed by the applicant and is disclosed herein. The special set of tetrahedrons are termed Correlating Tetrahedrons (CTs) with each, in turn, defining five hyperbolic paraboloids useful in building the unique and unanticipated new structures of this application. The CTs have four isosceles triangular faces with two opposite equal length edges designated L2 (14) and four other equal length edges designated L1 (10). The CTs are further defined by requiring an integer number of them to fit around a central axis (4). The six edges of the CT are used in three different combinations to become the four edges of each of three hyperbolic paraboloids. A mathematical equation has been developed such that when followed, the five hyperbolic paraboloids are defined for each value of n, n is an integer greater than or equal to 3.

What had not been recognized is the utility of using the hyperbolic paraboloids which divide these special CTs in half as structural members. The resulting hyperbolic paraboloids have dimensions and spatial arrangement that are correlated or defined by the special CTs. So correlated, the CT has imbued the hyperbolic paraboloids with the same characteristic dimensions L1 and L2, similar spatial layouts and when used as n-HyPars or N-HyPar LAs (defined below) the same axial and circumferential vertex separations such that they can be used as interconnectable structural members. The hyperbolic paraboloids form a correlated or related system of hyperbolic paraboloids wherein sufficient edges, corners and/or faces are spatially coincident when they are placed adjacently to enable three dimensionally stable connections. Because the hyperbolic paraboloids all emanate from the same tetrahedron, they become correlated and this newly discovered attribute is exploited to create a multitude of different composite structures. They can also be used as appurtenances of other geometric objects such as square bars, spheres, etc. so that these other geometric objects can also be joined in an interlocking fashion. The interlocking characteristics of these structures result from the saddle shaped compound curvature of the hyperbolic paraboloids.

There are five of these correlated hyperbolic paraboloid structural members, three of which divide the CT in half and half size truncations of two of them (actually, putting two of these half size truncations together can also be used to divide the CT in half). Using some nomenclature that needed to be invented to define and communicate these correlated hyperbolic paraboloids—nomenclature further defined later in this specification—the five correlated hyperbolic paraboloids are;

The L1 hyperbolic paraboloid—constructed between the four L1 edges of the CT—(26) of FIG. 1E.

The RH L2 or right handed or L2 right L1 hyperbolic paraboloid—a mirror image of the LH L2 hyperbolic paraboloid below constructed between the L2 edges and two other L1 edges connecting the L2 edges in a right handed sense analogous to a right handed helix and a distance between opposite corners of L1—(46) of FIG. 1K.

The truncated RH L2 hyperbolic paraboloid—a half size truncation of the RH L2 hyperbolic paraboloid having two edges that are half the length of the L2 edges, an L1 edge that joins the half-length L2 edges in a right handed sense analogous to a right handed helix and a fourth edge between the midpoints of the L2 edges—(47) of FIG. 3D.

The LH L2 or left handed or L2 left L1 hyperbolic paraboloid—a mirror image of the RH L2 hyperbolic paraboloid above. The LH L2 or left handed or L2 left L1 hyperbolic paraboloid—a mirror image of the RH L2 hyperbolic paraboloid above constructed between the L2 edges and two other L1 edges connecting the L2 edges in a left handed sense analogous to a left handed helix and a distance between opposite corners of L1—(50) of FIG. 1Q.

The truncated LH L2 hyperbolic paraboloid—a half size truncation of the LH hyperbolic paraboloid having two edges that are half the length of the L2 edges, an L1 edge that connects the half-length L2 edges in a left handed sense analogous to a left handed helix and a fourth edge between the midpoints of the 12 edges—(51) of FIG. 3E.

Note; the RH L2 and the LH L2 hyperbolic paraboloids are also sometimes referred to as the L2 hyperbolic paraboloids There are five categories of structures made possible by correlating the hyperbolic paraboloids above;

The correlated hyperbolic paraboloid structural members can be used individually and are further connectable to other correlated hyperbolic paraboloid structural members or other structures Correlated hyperbolic paraboloid structural members can be joined as pairs forming cells which are further connectable to other correlated hyperbolic paraboloid structural members or other structures The L1 correlated hyperbolic paraboloid structural members can be further aggregated into n-HyPars which can be stacked thus being further connectable to other correlated hyperbolic paraboloid structural members or other structures The L2 correlated hyperbolic paraboloid structural members can be further aggregated into n-HyPar LAs and are further connectable to other correlated hyperbolic paraboloid structural members or other structures The truncated L2 correlated hyperbolic paraboloid structural members can be further aggregated into cells and are further connectable to other correlated hyperbolic paraboloid structural members or other structures A CT is strategically arranged with two opposite edges of equal length, L2 (14), and the remaining four edges being of equal length, L1 (10), resulting in a tetrahedron with four isosceles triangular faces (18)—the isosceles triangle having one L2 side and two L1 sides. The two L2 edges of the CT are opposite i.e. not adjacent or touching each other in the CT and the four L1 edges do touch each other at their extremities making a zig-zag pattern in space. Specific ratios of the length of an L1 edge to the length of an L2 edge are what set the proportions and spatial layouts of the CTs of this application and in turn the edge lengths and spatial arrangements of the five hyperbolic paraboloid structural members. The set of specific ratios are determined by the variable "n" as discussed below and defined by the mathematical equation developed below. An individual CT can be of any size, the only requirements being the ratio of an L1 edge to an L2 edge must equal a specific value and the L2 edges must not be adjacent.

A CT (2) is used to properly size and correlate five hyperbolic paraboloids imbuing them with the same characteristic dimensions L1 and L2, similar spatial layouts and when used as n-HyPars or N-HyPar LAs (defined below) the same axial and circumferential vertex separations. The method for sizing the hyperbolic paraboloids relies on an integer number of the CTs being able to fit around a central axis (4) with no gaps or overlaps—this characteristic of an integer number fitting around a central axis with no gaps or overlaps is important in defining a CT as used in this application. Correlating Tetrahedrons (CT) are established with each, in turn, defining five hyperbolic paraboloid structural members useful in building the unique and unanticipated new structures of this application.

So defined, the hyperbolic paraboloid structural members can be used as interconnectable structural members—they are a correlated set of hyperbolic paraboloids. The interconnectability presents itself when these correlated hyperbolic paraboloid structural members are placed adjacently and sufficient edge, corner and/or faces become spatially coincident and thus can be connected resulting in a three dimensionally stable composite structure. Because the hyperbolic paraboloids all emanate from the same tetrahedron, they become correlated by this method of defining them and this correlation can be exploited to create a multitude of different composite structures.

The RH and LH hyperbolic paraboloids are analogous to a right handed and a left handed helix or screw thread. The RH and LH hyperbolic paraboloids are mirror images of each other and methods to distinguish one from the other are established later in this specification.

To further elaborate and quantify, the specific CT L1/L2 ratios can be calculated as a function of "n". As stated previously, these ratios then set the lengths and spatial arrangements of the four equal length L1 edges and the two equal length and opposite L2 edges. The curvature of the hyperbolic paraboloids is set when specific numerical values of L1 and L2 are chosen along with a value of n as has been done in FIGS. 2A, 2D, 2P and 2R (6, 7, 8, 9). The hyperbolic paraboloids defined by the CTs for this application always have a zero curvature center point and there is a perpendicular line at this zero curvature center point that is useful in describing connection of several composite structures.

The method for sizing the five hyperbolic paraboloids enables the calculation of the L1/L2 ratios for specific values of "n". Place n CTs around a central axis with one L2 edge of each CT on the central axis. In this configuration the integer number of CTs around a central axis forms a special dipyramid—one where the axial axis of length L2 is equal to one of the edges, each also of length L2, of the polygon formed at the mid-plane halfway between the axial vertices. The polygon at the mid-plane would be a triangle for n=3, a square for n=4, a pentagon for n=5, a hexagon for n=6 etc.

The arrangement of an integer number, n, of CTs around a central axis with no gaps and no overlaps is allowed only if specific ratios of L1/L2 are used. An example of this for n=4 is illustrated in FIG. 1B. In this arrangement each L2 edge at the mid-plane of the square dipyramid of FIG. 1B (3) subtends an angle of 360°/4 (note that we use n, not the value of n=4 in the derivation of the general mathematical formula below). From the geometry of the CT a geometric analysis can be performed considering that one L2 edge will be the axial axis of the dipyramid of n CTs, and the other L2 edge will be in the mid-plane half way between the axial vertices (30) and will be one of n chords of a circle setting the equal spacing of the circumferential vertices (34) of the n-fold hyperbolic paraboloid (n-HyPar) and the n-fold hyperbolic paraboloid lattice assemblies (n-HyPar LAs) that result—more on the definition of the n-HyPar and the n-HyPar LA follows. The geometric analysis of one of the CTs in the dipyramid configuration results in the following equation;

$$\frac{L1}{L2} = \frac{\left[1 + \left(\frac{1}{\sin\frac{360°}{2n}}\right)^2\right]^{\frac{1}{2}}}{2}$$

This equation establishes allowed parameters for all correlated hyperbolic paraboloid structural members and also does four important things that make use of the n-HyPars and the n-HyPar LAs unique and surprisingly effective structural members;

1. it forces the characteristic dimensions of the L1 (all four edges are of length L1) and the L2 (two edges are of length L2 and the other two are of length L1) hyperbolic paraboloids to be such that an integer number of them also fit symmetrically around a central axis,
2. this equation further establishes the specific ratios of the characteristic dimensions of the L1 hyperbolic paraboloids (its edges and distance between opposite vertices) to be such that when placed symmetrically around the axial axis all their edges are congruent completely enclosing an inner volume with no gaps or overlaps and
3. this equation forces the length of the axial axis (e.g. the line between axial vertices of FIGS. 2B, 2E, 2N, and 2S) to be equal to the distance between two adjacent circumferential vertices, a characteristic that allows stacking (defined below) of the L1 n-HyPars and creates an n-sided polygon at the mid-plane of the n-HyPar LAs, and
4. when any combination of the three hyperbolic paraboloids (the L1 and the two L2 hyperbolic paraboloids) are used in an n-HyPar LA, this equation results in at least two edges of each adjacent hyperbolic paraboloid being congruent.

The following table tabulates these L1/L2 values for the first several values of n;

| N | L1/L2 |
|---|---|
| 3 | 0.764 |
| 4 | 0.866 |
| 5 | 0.987 |
| 6 | 1.118 |
| 7 | 1.256 |
| 8 | 1.399 |
| 9 | 1.545 |
| 10 | 1.694 |
| 11 | 1.844 |
| 12 | 1.996 |
| Continues for higher values | Continues for higher values |

Thus the specific CTs constructed from the above L1s and L2s has defined the hyperbolic paraboloids used in the structures and toys of this application. A geometric analysis has shown the method for sizing hyperbolic paraboloids of this application can be transformed from one of using the CTs to an equivalent method or process, i.e. one of conforming to the mathematical equation above.

The correlated hyperbolic paraboloids of this application when sized according to the mathematical formula above can be used in four ways;

A. n-fold hyperbolic paraboloids (n-HyPars) can be constructed from the L1 hyperbolic paraboloids by placing n of them around a central axis with the edges of adjacent hyperbolic paraboloids being congruent thus enclosing an internal volume with no gaps or overlaps. The interior of n-HyPars could be either hollow or solid.

B. n-fold hyperbolic paraboloid lattice assemblies (n-HyPar LAs) can be constructed from a combination of the L1 and L2 (there are two L2 hyperbolic paraboloids and they are mirror images of each other) hyperbolic paraboloids which can also be placed around a central axis forming an n-fold hyperbolic lattice assembly (n-HyPar LA)—actually an n-HyPar LA can be formed from any combination of the L1 and/or the L2 hyperbolic paraboloids and/or the appropriate CT isosceles triangles with the exception of having all L1 members which would make it an n-HyPar. Although the n-HyPar LAs don't completely enclose an internal volume like the n-HyPars do, the resulting assemblies for some values of n (for n=3, 4, 6, and a combination of 4 and 8) do fill space with no gaps or overlaps between assemblies and all n-HyPar LAs have some other surprising strength, rigidity and other geometrical characteristics e.g. the mid-plane between the axial vertices is a polygon of n equal sides and they can be assembled to be periodic throughout space.

C. The L1 and L2 hyperbolic paraboloids can also be used individually or in combination to construct repeating cellular and lattice structures which effectively harness material properties to result in a structure with inherent strength, rigidity and lightweight structures due to the hyperbolic paraboloid shape of the cell walls. The L1 and L2 hyperbolic paraboloids can be used in toys. Also the L1 and L2 hyperbolic paraboloids can be applied as appurtenances to other geometric objects such as square bars FIG. 4L (56), spheres, etc. such that these other geometric objects can be joined in an interlocking fashion.

D. As truncated L2 hyperbolic paraboloids (left and right) where the truncated L2 hyperbolic paraboloid only extends from one end of the L2 edge on the central axis to the mid-plane (actually only completing half the L2 edge on the mid-plane as well as half the L2 edge on the central axis). Additionally the L2 hyperbolic paraboloid can be truncated and used to construct additional cellular (FIGS. 3F, 3G, and 3H (68, 72, 74)), lattice or labyrinthal structures. A very useful truncation results in a hyperbolic paraboloid that has two half-length L2 edges, an L1 edge that connects one end of each L2 edge and an edge that connects the remaining two L2 edge ends.

FIG. 1A is the CT and FIG. 1B is an example of a dipyramid (in this case a square dipyramid) made by placing four CTs around a central axis (the square is the four L2 edges (14)—at the mid-plane of this figure). FIG. 1C is the CT in a special orientation where the two L2 edges cross at their mid points—an L1 hyperbolic paraboloid, (26), is shown inside this CT. In this orientation the CT and the L1 hyperbolic paraboloid have a square profile and the perpendicular line at the zero curvature center point (16) of the L1 hyperbolic paraboloid passes through the mid points of the two L2 edges and appears as a point. FIG. 1D illustrates the L1 hyperbolic paraboloid by itself but in the same orientation as FIG. 1C also showing it has a square profile when viewed directly down the perpendicular line at the zero curvature center point. FIG. 1E is a perspective view of the L1 hyperbolic paraboloid created by the two steps depicted by FIGS. 1C and 1D. FIG. 1F illustrates how an L1 hyperbolic paraboloid for n=4 would interface with the central axis of the dipyramid of FIG. 1B (visually it would occupy the right CT of FIG. 1B where four of them are used to create the square dipyramid). Note that it has all L1 edge lengths (10) and that two of its corners become axial vertices (30) and the other two become circumferential vertices (34) when used as one of an assembly of hyperbolic paraboloids placed symmetrically around a central axis as depicted in FIG. 1F.

The two mirror image hyperbolic paraboloids which divide the CT in half can be distinguished from each other using one method as follows. FIGS. 1K and 1L (46) depict one of the mirror image L2 hyperbolic paraboloids whose edge dimensions are defined by the two L2 edges of the CT and the two L1 CT edges that connect these two L2 edges in a right handed sense, analogous to a right handed helix. The handedness of the CT hyperbolic paraboloids which utilizes two L2 edges is determined by the following procedure. Place the hyperbolic paraboloid on a flat surface in front of you with one L2 edge oriented from left to right. In this orientation one end of the second L2 edge will be on the flat surface toward the back and its other end will be elevated toward the front over the first L2 edge. If the L1 CT edge in the foreground which connects to the two L2 edges leans to the right as it rises as in FIG. 1L, it is a right handed hyperbolic paraboloid and is designated the L2 right L1 hyperbolic paraboloid.

FIGS. 1Q and 1R (50) depict the other mirror image L2 hyperbolic paraboloid which divides the CT in half. Its edge dimensions are defined by the two L2 edges of the CT and the two L1 edges that connect these two L2 edges in a left handed sense, analogous to a left handed helix. The handedness of the DCT hyperbolic paraboloids which utilize two L2 edges is determined by the following procedure. Place the hyperbolic paraboloid on a flat surface in front of you with one L2 edge oriented from left to right. In this orientation one end of the second L2 edge will be on the flat surface toward the back and its other end will be elevated toward the front over the first L2 edge. If the L1 CT edge in the foreground which connects to the two L2 edges leans to the left as it rises as in FIG. 1R, it is a left handed hyperbolic paraboloid and it is designated as the L2 left L1 hyperbolic paraboloid.

A second method for distinguishing the two mirror image L2 hyperbolic paraboloids is to envision you are at the midpoint of one L2 edge with the midpoint of the other 12 edge beneath your feet and you look at the extremity of the L2 edge—if the L1 edge leaving that extremity extends downward and to the right, it is the right handed or L2 right L1 hyperbolic paraboloid—if the L1 edge leaving the extremity extends downward and to the left, it is the left handed or L2 left L1 hyperbolic paraboloid.

FIG. 1G illustrates how the L2 right L1 hyperbolic paraboloid fits into and is thereby defined by the CT. In this orientation, the perpendicular line at the zero curvature center point passes through the zero curvature center point of the hyperbolic paraboloid from lower left to upper right. FIG. 1H illustrates the L2 right L1 hyperbolic paraboloid by itself but in the same orientation as FIG. 1G. FIG. 1J shows the L2 right L1 hyperbolic paraboloid has a rectangular profile when viewed directly down the perpendicular line at the zero curvature center point. FIG. 1K is a perspective view of the L2 right L1 hyperbolic paraboloid created by the two steps depicted by FIGS. 1G and 1H. FIG. 1L illustrates how the right handed or L2 right L1 hyperbolic paraboloid would interface with a central axis when used as part on an n-HyPar LA.

FIG. 1M illustrates how the L2 left L1 hyperbolic paraboloid fits into and is thereby defined by the CT. In this orientation, the perpendicular line at the zero curvature center point passes through the mid-point from lower right to upper left. FIG. 1N illustrates the L2 left L1 hyperbolic paraboloid by itself but in the same orientation as FIG. 1M. FIG. 1P shows the L2 left L1 hyperbolic paraboloid has a rectangular profile when viewed directly down the perpendicular line at the zero curvature center point. FIG. 1Q is a perspective view of the L2 left L1 hyperbolic paraboloid created by this sequence of steps. FIG. 1R illustrates how the left handed or L2 left L1 hyperbolic paraboloid would interface with a central axis when used as part on an n-HyPar LA.

In summary the above has defined how to size hyperbolic paraboloids and when sized according to the methods above, unique and previously unrecognized uses of these hyperbolic paraboloids can be exploited to construct a multitude of composite structures.

First Commercial Embodiment

Use of the L1 hyperbolic paraboloid structural members to create the n-fold hyperbolic paraboloids and composite structures (n-HyPars) All of FIG. 2x.

The "n" in the title of the n-HyPars of this application is a variable for the set of integers greater than or equal to three. Thus, this application includes the 3-fold hyperbolic paraboloid, the 4-fold hyperbolic paraboloid, the 5-fold hyperbolic paraboloid, the 6-fold hyperbolic paraboloid, etc. and related structures. For each "n" there is a different CT and therefore a different L1 hyperbolic paraboloid structural member used to form the structures and toys of this application.

A unique characteristic (the ability to be stacked) emerges from the CT correlation for the L1 hyperbolic paraboloids (26) when they are further aggregated as n-HyPars (defined later). Stacking is a process by which the axial vertices of one are placed between two adjacent circumferential vertices of a second, an action that also places the axial vertices of the second between two adjacent circumferential vertices of the first—the hyperbolic paraboloid faces of both now being congruent.

The n-HyPars have the dual characteristics of an integer number of them fitting around a central axis plus the ability to be stacked. Both of these characteristics being available in the same hyperbolic paraboloid led to the discovery and creation of the n-fold hyperbolic paraboloids (n-HyPars), n an integer greater than or equal to 3, of this application. The n-HyPars e.g. FIGS. 2B, 2E, 2N and 2S (20,21,23,25) use the L1 hyperbolic paraboloids which are sized and correlated by a procedure of first placing n CTs around a central axis with the edges of adjacent hyperbolic paraboloids being congruent and secondly constructing the L1 hyperbolic paraboloids between the L1 edges (10) of the CT. The n-HyPars are then subsequently constructed be placing n of the L1 hyperbolic paraboloids around a central axis with two opposite corners touching the central axis and the L1 edges of adjacent L1 hyperbolic paraboloids made congruent. The 4-fold hyperbolic paraboloid (4-HyPar) of FIG. 2E (21) has the special attribute of being space filling. Like the cube, the 4-HyPars can be continuously stacked so that they completely enclose a volume, there is no unenclosed volume between them and there are no gaps or overlaps.

FIG. 2A illustrates how all the n=3, L1 hyperbolic paraboloids (6) of this embodiment are placed relative to the central axis (4) when creating a 3-HyPar (20). FIG. 2B illustrates an example of the first embodiment, the 3-fold hyperbolic paraboloid (3-HyPar). The surface of the 3-HyPar consists of three, n=3, L1 hyperbolic paraboloids placed around a common central axis with their edges congruent thereby forming a closed volume. The interior of the 3-HyPar could be either hollow or solid and if hollow, the 3-HyPar has inherent strength and rigidity characteristics due to the hyperbolic paraboloid shape of each of its three connected hyperbolic paraboloid shaped faces. In addition to these three faces the 3-HyPar has six edges (each the length of the L1 CT edge), two axial vertices and three circumferential vertices. The circumferential vertices lie in a plane midway between the axial vertices and the plane is perpendicular to the central axis drawn between the axial vertices. With this configuration the distance between the axial vertices is exactly the same as the distance between adjacent circumferential vertices, a property which allows stacking (defined later) of the 3-HyPars.

FIG. 2D illustrates how all the n=4, L1 hyperbolic paraboloids (7) of this embodiment are placed relative to the central axis (4) when creating a 4-HyPar (21). FIG. 2E illustrates another example of the first embodiment, the 4-fold hyperbolic paraboloid (4-HyPar). The surface of the 4-HyPar consists of four, n=4, L1 hyperbolic paraboloids placed around a common central axis with their edges congruent thereby forming a closed volume. The interior of the 4-HyPar could be either hollow or solid and if hollow, the 4-HyPar has inherent strength and rigidity characteristics due to the hyperbolic paraboloid shape of each of its four connected hyperbolic paraboloid shaped faces. In addition to these four faces the 4-HyPar has eight edges (each the length of the L1 CT edge), two axial vertices and four circumferential vertices. The circumferential vertices lie in a plane midway between the axial vertices and the plane is perpendicular to the central axis drawn between the axial vertices. With this configuration the distance between the axial vertices is exactly the same as the distance between adjacent circumferential vertices, a property which allows stacking (defined later) of the 4-HyPars.

The 4-HyPar has a unique property among the n-HyPars, like the cube, 4-HyPars can be continuously stacked to fill space with no overlaps, no gaps, nor any unenclosed space between them. The space filling characteristic of the 4-HyPars can be exploited to create further structures. FIGS. 2F and 2G illustrate how a bar (57), composed of 4-HyPars joined at selected hyperbolic paraboloid faces can be created for use as a structural element. FIG. 2H is a cross sectional and perspective view showing how a planar array (58) composed of 4-HyPars joined at selected hyperbolic paraboloid faces can be created for use as a structural element. FIG. 2J is a cross sectional and perspective view showing how an I beam (60) composed of 4-HyPars joined at selected hyperbolic paraboloid faces can be created for use as a structural element. FIG. 2K is a cross sectional and perspective view showing how an L beam (62) composed of 4-HyPars joined at selected hyperbolic paraboloid faces can be created for use as a structural element. FIG. 2L is a cross sectional and perspective view showing how a channel beam (64) composed of 4-HyPars joined at selected hyperbolic paraboloid faces can be created for use as a structural element. FIG. 2M is a cross sectional and perspective view showing how a box beam (66) composed of 4-HyPars joined at selected hyperbolic paraboloid faces can be created for use as a structural element. Although FIGS. 2F through 2M pertain to 4-HyPars, other structural elements composed of other n-HyPars can also be created for use as different (but for a similar purpose) structural elements FIG. 2P illustrates how all the n=6, L1 hyperbolic paraboloids (8) of this embodiment are placed relative to the central axis (4) when creating a 6-HyPar (23). FIG. 2N illustrates another example of the first embodiment, the 6-fold hyperbolic paraboloid (6-HyPar). The surface of the 6-HyPar consists of six, n=6, L1 hyperbolic paraboloids placed around a common central axis with their edges congruent thereby forming a closed volume. The interior of the 6-HyPar could be either hollow or solid and if hollow, the 6-HyPar has inherent strength and rigidity characteristics due to the hyperbolic paraboloid shape of each of its six connected hyperbolic paraboloid shaped faces. In addition to these six faces the 6-HyPar has twelve edges (each the length of the L1 CT edge), two axial vertices and six circumferential vertices. The circumferential vertices lie in a plane midway between the axial vertices and the plane is perpendicular to the central axis drawn between the axial vertices. With this configuration the distance between the axial vertices is exactly the same as the distance between adjacent circumferential vertices, a property which allows stacking (defined later) of the 6-HyPars.

FIG. 2R illustrates how all the n=8, L1 hyperbolic paraboloids (9) of this embodiment are placed relative to the central axis (4) when creating an 8-HyPar (25). FIG. 2S illustrates another example of the first embodiment, the 8-fold hyperbolic paraboloid (8-HyPar). The surface of the 8-HyPar consists of eight, n=8, L1 hyperbolic paraboloids placed around a common central axis with their edges congruent thereby forming a closed volume. The interior of the 8-HyPar could be either hollow or solid and if hollow, the 8-HyPar has inherent strength and rigidity characteristics due to the hyperbolic paraboloid shape of each of its four connected hyperbolic paraboloid shaped faces. In addition to these eight faces the 8-HyPar has sixteen edges (each the length of the L1 CT edge), two axial vertices and eight circumferential vertices. The circumferential vertices lie in a plane midway between the axial vertices and the plane is perpendicular to the central axis drawn between the axial vertices. With this configuration the distance between the axial vertices is exactly the same as the distance between adjacent circumferential vertices, a property which allows stacking (defined later) of the 8-HyPars.

FIGS. 2B, 2E, 2N, and 2S are only four of the many n-fold hyperbolic paraboloids (n-HyPars) that can be created. All n-HyPars use the L1 hyperbolic paraboloid for their faces, all form closed volumes, all have one L2 edge as the axial axis and the other L2 edge as one of n chords of the circle containing the circumferential vertices at the mid-plane between the two axial vertices, and all of these have 2n edges each of length L1. The interior of the n-HyPar could be either hollow or solid and if hollow, all n-HyPars have inherent strength and rigidity characteristics due to the hyperbolic paraboloid shaped faces and all have the distance between the axial vertices exactly the same as the distance between adjacent circumferential vertices, a property which allows stacking (defined later) of all n-HyPars.

Operation, first embodiment—e.g. FIGS. 2C, 2E, 2F, 2H, and 2J

In addition to the n-HyPars being useful as structural elements or toys individually, they can also be stacked. Stacking is a process by which the axial vertices of one are placed between two adjacent circumferential vertices of a second, an action that also places the axial vertices of the second between two adjacent circumferential vertices of the first—the hyperbolic paraboloid faces of both now being congruent.

FIG. 2C illustrates the formation of a simple structure by the stacking of two of the 3-HyPars of FIG. 2B. Stacking is used to create structures consisting of multiple individual n-HyPars joined by affixing them hyperbolic paraboloid surface-to-hyperbolic paraboloid-surface. The stacking of one n-fold hyperbolic paraboloid to a second said n-fold hyperbolic paraboloid (in this first example, one 3-HyPar to a second 3-HyPar) occurs along their respective perpendicular lines at their zero curvature center points (16) i.e. when stacked the two perpendicular lines at the two zero curvature center points are now congruent. When stacked, the four L1 CT edges at each joint exactly coincide. In this manner the hyperbolic paraboloid surfaces of each 3-hypar not only fit together well, they are now congruent. Note that three points are labeled (30, 34) in FIG. 2C signifying those points are both the axial vertex (30) of one 3-HyPar and a circumferential vertex (34) of the second 3-HyPar. The fourth point where an axial vertex is joined to a circumferential vertex is hidden from view in FIG. 2C and also note there is a circumferential vertex (34) of each 3-hypar that did not participate in the stacking. More 3-HyPars could be added to the stack as desired.

In FIG. 2F, four 4-HyPars are stacked. When joined stacked the four L1 CT edges at each joint exactly coincide. In FIG. 2G twelve 4-hypars are stacked in a manner such that some extend into all three spatial dimensions, this stacking process could be continued to completely fill space if desired which is a special characteristic of the 4-HyPar. In this manner the hyperbolic paraboloid surfaces of each 4-hypar not only fit together well, they are now congruent. In both figures note the points that are both the axial vertex (30) of one 4-HyPar and the circumferential vertex (34) of the joining 4-HyPar.

In FIG. 2Q, three, 6-HyPars are stacked. When stacked, the four L1 CT edges at each joint exactly coincide. More 6-HyPars could be added to the stack as desired. In this manner the hyperbolic paraboloid surfaces of each 6-HyPar not only fit together well, they are now congruent. In both figures note the points that are both the axial vertex (30) of one 6-HyPar and the circumferential vertex (34) of the joining 6-HyPar.

In FIG. 2T, four, 8-HyPars are stacked. When stacked, the four L1 CT edges at each joint exactly coincide. More 8-HyPars could be added to the stack as desired. In this manner the hyperbolic paraboloid surfaces of each 8-HyPar not only fit together well, they are now congruent. In both figures note the points that are both the axial vertex (30) of one 8-HyPar and the circumferential vertex (34) of the joining 8-HyPar.

In addition to the property which allows stacking of similar n-HyPars, when a hyperbolic paraboloid surface from one n-HyPar is joined with the hyperbolic paraboloid surface of a second similar n-HyPar in a stack it interlocks. The two are then constrained against rotation about their congruent perpendicular lines at their zero curvature center points and the two are also constrained from sliding in either of the two perpendicular directions. An illustration of how this interlocking occurs is provided in FIG. 4L where two square bars (56) with one hyperbolic paraboloid end are joined at their hyperbolic paraboloid ends thus becoming interlocked. When stacking n-HyPars, this interlocking occurs for each additional n-HyPar added to the stack and additionally may completely restrain an earlier n-HyPar depending on where the next n-HyPar is added. Thus a stack of n-HyPars without any means of attachment between the n-HyPars can be created having some stability due to the interlocking characteristics of the n-HyPars. Further stability and strength of the composite stack can be achieved by providing a means to affix the n-HyPars to each other at their joined hyperbolic paraboloid faces.

Affixing the n-HyPars results in the creation of strong structures. For example a long string of affixed n-HyPars could be used as a thin beam or bar then further used or to construct a regular three dimensional lattice useful as a truss. An affixed planar stacking of selected n-HyPars could be assembled resulting in something that could be used as a wall, a floor, a ceiling, etc. Trusses of various configurations can be created by an appropriate stacking of affixed n-HyPars. A wide variety of similar useful stackings of affixed n-HyPars are possible. Additionally, these n-HyPars could be useful by themselves for example as foam packaging material etc.

These n-HyPars can be used as individual elements as well as in stacks, e.g. they could be used as the hub of a wheel or as pieces of a toy where they can be stacked like blocks or as appurtenances to other structural elements like square bars (56) or spheres etc. . . .

Second Commercial Embodiment

Use of the L1, L2 and/or the truncated L2 Hyperbolic paraboloids to create the n-fold hyperbolic paraboloid lattice assemblies (n-HyPar LAs) and composite structures, All of FIG. 3x.

The n-fold hyperbolic paraboloid lattice assemblies (n-HyPar LAs) e.g. FIG. 3B (48) of this application use the L1, L2 and/or the truncated L2 hyperbolic paraboloids (26, 46, 47, 50, 51) which are sized and correlated by a procedure of first placing n CTs around a central axis with the edges of adjacent hyperbolic paraboloids being congruent and secondly constructing the L2 hyperbolic paraboloids between the two L2 edges (14) and two or all four of the L1 edges (10). The n-HyPar LAs are then subsequently constructed by placing n of the L1, L2 and/or truncated L2 hyperbolic paraboloids around a central axis with one L2 edge on the central axis—in so doing the length of the axial axis becomes equal to the length between adjacent circumferential vertices. Actually an n-HyPar LA can be formed from any combination of the L1, L2 and truncated L2 hyperbolic paraboloid structural members with the exception of having all L1 hyperbolic paraboloids which would make it an n-HyPar. Although the n-HyPar LAs don't completely enclose an internal volume like the n-HyPars do, the resulting assembly can be made to be periodic throughout space and they have a unique characteristics wherein, at the mid-plane between the axial vertices, a polygon of n equal sides results. All of the n-HyPar LAs can be further connected to themselves or other correlated hyperbolic paraboloid structural members.

In the example presented in FIG. 3B, (48) the n=4 right handed or n=4 L2 right L1 hyperbolic paraboloids (5) are used. Like the L2 edge of the n-HyPars above, one L2 edge of the n-HyPar LA of each hyperbolic paraboloid is placed on the central axis (4) causing the other L2 edge to be placed symmetrically around the central axis forming an n-sided polygon (in this example a square) at the mid-plane of the lattice assembly. This other non-axis L2 edge becomes one of n chords of a circle at the mid-plane. FIG. 3A is the L2 hyperbolic paraboloid used in FIGS. 3B and 3C and it is shown as it interfaces with the central axis. Like the n-HyPars above, the n-HyPar LAs fit within the envelope defined by having n CTs placed symmetrically about a central axis i.e. a dipyramid with the central axis being equal in length to one of the mid-plan polygon's edges . . . . Also like the n-HyPars above, the n-HyPar LAs have two axial (30) and n circumferential (34) vertices. The circumferential vertices of the n-Hy- Par LAs are at the extremities of the L2 edges that form the mid-plane polygon. Unlike the n-HyPars above, the n-HyPar LAs do not enclose an internal volume, rather they remain as an open lattice assembly of n individual hyperbolic paraboloids. When taken as an envelope, the n=3, 4, 6, and 4 plus 8 lattice assemblies do fill space i.e. there are no gaps or overlaps nor any unenclosed volume between lattice assemblies. All of the remaining n-HyPar LAs can be arranged to be periodic in space and will result in labyrinthal composite structures.

Additionally the L2 hyperbolic paraboloid can be truncated and used to construct additional cellular FIGS. 3F, 3G, and 3H (68, 70, 72)), lattice or labyrinthal structures. The very useful truncation results in a hyperbolic paraboloid that has two half-length L2 edges, an L1 edge that connects the ends of the half-length L2 edges and a fourth edge between the midpoints of the L2 edges. The truncated L2 hyperbolic paraboloids only extend from one axial vertex on the end of the L2 edge on the central axis to the mid-plane (thus only half the L2 edge on the central axis and half the L2 edge on the mid-plane are used in this truncated L2 hyperbolic paraboloid). These truncated L2 hyperbolic paraboloid structural members can be used individually, further connected to themselves, connected to other correlated hyperbolic paraboloid structural members or connected to other structures.

FIG. 3D illustrates a truncated L2 right L1 hyperbolic paraboloid (47) which is also shown from another perspective in FIG. 1H where it is the lower right or upper left portion of that L2 right L1 hyperbolic paraboloid. FIG. 3E illustrates a truncated L2 left L1 hyperbolic paraboloid (51) which is also shown from another perspective in FIG. 1N where it is the lower left or upper right portion of that L2 hyperbolic paraboloid. Of special structural use is a truncated right handed L2 hyperbolic paraboloid (47) joined with a truncated left handed L2 hyperbolic paraboloid (51) to form a truncated L2 hyperbolic paraboloid cell which is illustrated in FIG. 3F (68).

FIG. 3G illustrates four of these truncated L2 hyperbolic paraboloid cells (68) joined to a central axis and to selected edges of other cells. This cellular structure (70) could be joined at its edges to the four lattice assemblies of FIG. 3C by positioning its central axis to vertically run through the center point of this layer of lattice assemblies (the point where four circumferential vertices (34) meet) thereby creating a layer of lattice and cellular assemblies that has no portion of a n-HyPar LA or cellular assembly sticking above the common surface, a construction that is useful for further joining to other structures or for utilization as a planar structure itself. FIG. 3H illustrates eight of the truncated L2 hyperbolic paraboloid cells (68) joined in a linear array to create a different cellular assembly (72). These are only a few of the many examples of cellular structures that can be created from the truncated L2 hyperbolic paraboloids.

Operation, second embodiment, FIGS. 3B and 3C

In FIG. 3C, four of the n=4, 4-HyPar LAs of FIG. 3B are joined at their non-axis L2 edges to form a composite structure having circumferential vertices (34) at these joints. More 4-HyPar LAs could be added to extend this composite structure as far as desired in this "plane." A second plane of 4-hypars would fit exactly above or below the original plane by placing them such that the central axis of the 4-HyPar LAs being added is offset to pass through the common point where 4 circumferential vertices of the first layer meet rather than coincide with the central axes of the first layer of 4-HyPar LAs. In this manner the central axes of the 4-HyPars of the first layer pass through the common point where four circumferential vertices of the second layer meet. This layering could be repeated indefinitely and each layer can be extended indefinitely as well. In this manner a composite structure of any number of layers could be constructed with certain edges of each 4-HyPar LA being congruent with edges of neighboring 4-HyPar LAs.

Any of the n=3, 4, 6-HyPar LAs could be aggregated into a single layer composite structure as described above with configurations as multi-layered structures which fill space with no gaps between assemblies, no overlap of assemblies and no unenclosed volume between assemblies e.g. the 4-HyPar LA (48) of FIGS. 3B and 3C. Similarly a combination of the 4-HyPar LAs and the 8-HyPar LAs could be configured with alternating rows having axial axes vertical then horizontal and continuing to alternate as additional layers are added on to fill space. Additionally, the 4-HyPar LA can be configured another way with six of them having their central axes converge at a common point with this configuration also able to be repeated indefinitely to fill space. The n–3, 4, 6 and 8-HyPar LAs can be arranged to fill space whereas only the 4-HyPar above fills space. While filling space is a valuable characteristic it is not always necessary, it is often quite adequate to have a structure with openings in it as can be done with the other n-HyPar LAs, n-HyPars and truncated L2 hyperbolic paraboloid structures . . . . Cellular, lattice and labyrinthal structures of n-HyPars, n-HyPar LAs and truncated L2 hyperbolic paraboloids are useful and provide many design choices for structures.

Third Commercial Embodiment

Use of the L1 and the L2 hyperbolic paraboloids individually and as cells to be combined to create other composite cellular, to construct repeating lattice and labyrinthal assemblies, or to be put onto other structural members such as square bars FIG. 4L (56) or spheres to allow the attachment or interlocking of these other shapes, or to be used as toys, All of FIG. 4x.

The sizing of the L1 and the L2 hyperbolic paraboloids by using a Correlating Tetrahedron (CT) and the mathematical equation above to define them results in hyperbolic paraboloids that are versatile and can be used in many other ways in addition to the n-HyPars and the n-HyPar LAs described in the two previous embodiments. The fact that there are right handed and left handed L2 hyperbolic paraboloids adds to the versatility of the correlated hyperbolic paraboloid structural members.

The correlated hyperbolic paraboloid cells are created by joining two correlated hyperbolic paraboloids such that they form a closed portion and an opening i.e. a cell. The n=4 L1 hyperbolic paraboloid cell (69) has the especially useful attribute of the cell opening forming a rhombus with two opposite angles of 60 degrees and the other two opposite angles being 120 degrees. These cells can then be used to construct further composite structures such as the 4-HyPar FIG. 2E (7), a linear cellular structure with a triangular cross section FIG. 4B (28), a hyperbolic paraboloid rhombohedron FIG. 4D (74), and a hyperbolic rhombic dodecahedron FIG. 4E (76). All of the hyperbolic paraboloid cells can be further connected to themselves or other correlated hyperbolic paraboloid structural members.

The L2 hyperbolic paraboloids can also be truncated such that they have two half-length L2 edges, one L1 edge connecting one end of each half-length L2 edge with the other and a fourth edge between the midpoints of the L2 edges. These truncated L2 hyperbolic paraboloids can be used to create cellular structures e.g. FIGS. 3F, 3G, and 3H and they can be further connected to themselves or other correlated hyperbolic paraboloid structural members.

The L1, L2, and truncated L2 hyperbolic paraboloids can also be used in combination to construct cellular, repeating lattice and labyrinthal structures which effectively harness material properties to result in a structure with inherent strength, rigidity and lightweight properties due to the hyperbolic paraboloid shape of the cell walls. The L1 and L2 hyperbolic paraboloids can also be used in toys FIGS. 4F, 4G, 4H, 4J, and 4K as well as having uses wherein they can be applied as appurtenances to other geometric objects such as square bars FIG. 4L (56), spheres, etc. such that these other geometric objects can be joined in an interlocking fashion or connected to other correlated hyperbolic paraboloids.

FIG. 4A illustrates an L1 Hyperbolic paraboloid in a given orientation. FIG. 4B shows the hyperbolic paraboloid of FIG. 4A joined with many other similar hyperbolic paraboloids to create a cellular structure (28) with a triangular cross section which can be repeated indefinitely to create an even larger composite cellular structure. The cell wall thickness would be just the thickness of the hyperbolic paraboloid. The compound curvature of the hyperbolic paraboloids results in a cellular component that is more rigid than a flat planar surface and more effectively harnesses the strength and rigidity properties of the materials of construction. The multi-celled composite structures that can be created are unique and have aesthetic and utilitarian uses.

FIG. 4C illustrates an n=4 hyperbolic paraboloid cell whose opening is a rhombus with two 60 degree and two 120 degree angles. These cells make up the n=4 hyperbolic cellular assembly of FIG. 2B. This cell is also very versatile as it can be used to construct hyperbolic paraboloid rhombohedrons, hyperbolic paraboloid dodecahedrons and many other composite structures.

FIG. 4D illustrates a hyperbolic paraboloid rhombohedron composed of n=4 L1 hyperbolic paraboloid cells wherein the edges are congruent with the edges of the traditional rhombohedron.

FIG. 4E illustrates a hyperbolic paraboloid rhombic dodecahedron composed of n=4 L1 hyperbolic paraboloid cells wherein the edges are congruent with the edges of the traditional rhombic dodecahedron.

FIG. 4F illustrates one example of how an L1 or an L2 hyperbolic paraboloid can be connected to others at their edges by putting attachment features into the hyperbolic paraboloids that would be compatible with a connector for use as a toy.

FIG. 4G is a connector for use with the toys of FIG. 4F, FIG. 4H illustrates the connector of FIG. 4G attached to the toy of FIG. 4E, FIG. 4J illustrates a toy three bladed propeller, and FIG. 4K illustrates a toy six bladed propeller FIG. 4L shows the ends of two bars with hyperbolic paraboloid surfaces and how the two bars can be brought together thereby interlocking the two bars from rotation about their common long axes and translation in the plane perpendicular to their long axes.

Putting the L1 hyperbolic paraboloid (recall it has a square profile when viewed down the perpendicular line at the zero curvature center point) onto the end of two square bars (56) would allow the two bars to be joined at their hyperbolic paraboloid faces and would then become interlocked such that rotational force from one could be transmitted to the other and they could be separated if transmission of the rotational energy needed to be interrupted. The bars don't have to be affixed to each other to transmit rotational energy, it is done by the inherent shape of the hyperbolic paraboloids which interlock when mated with a similar one. This could be done with other shaped structural members such as spheres as well. The L2 hyperbolic paraboloids could also be used in this manner where there rectangular profile when viewed down the perpendicular line at their zero curvature center points is compatible with the intended use.

Operation, third embodiment

Correlated hyperbolic paraboloid cells can be further connected to themselves or other correlated hyperbolic paraboloid structural members.

Each of the five types of hyperbolic paraboloids could be attached at their edges corners and/or faces since all edges and corners coincide with the edges and corners (and the resulting faces) of the CT.

Each of the L1 and L2 hyperbolic paraboloids could be placed onto other geometric bodies thereby allowing them to be joined. As one specific example the hyperbolic paraboloid of FIGS. 1C and 1D, when viewed along an axis through their zero curvature center points possess a square profile and thus this hyperbolic paraboloid could be placed onto the end of a long bar with a square cross section and two such bars could then be connected in an interlocking manner at their hyperbolic paraboloid ends. Other examples would include putting these hyperbolic paraboloids onto bosses extending from the surfaces of spheres at six points such that the three axes drawn between pairs of points are mutually orthogonal. This would then allow connection of these spheres in an interlocking fashion in a three dimensional square array. In other uses, the L1 and L2 hyperbolic paraboloids could be used as toys.

ADVANTAGES

From the description above a number of advantages of these presently preferred embodiments become evident:

The correlated hyperbolic paraboloids of this application are all interconnectable as they are imbued with the same characteristic dimensions and layouts such that when placed adjacently, sufficient edges, corners and/or faces become spatially coincident to allow a three dimensionally stable connection of the adjacent hyperbolic paraboloids.

The n-fold hyperbolic paraboloids and their composite structures of this application are made possible by the utilization of hyperbolic paraboloids that have both of two characteristics; 1) an integer number of them can fit around a central axis completely enclosing an internal volume with no gaps or overlaps and 2) they can be stacked.

Because the proportions of these hyperbolic paraboloids are defined by the CT and/or the mathematical equation above, the n-HyPars can be stacked.

The 4-HyPars fill space, i.e. they can be stacked continuously with no unenclosed volume between them, no gaps nor any overlaps.

The hyperbolic paraboloids imbue these structures and the many composite structures created from them with inherent structural rigidity and strength.

The n-fold hyperbolic paraboloids are new structures.

The n-fold hyperbolic paraboloid lattice assemblies are new structures.

Correlated hyperbolic paraboloid structural members joined as pairs to form cells are new structures.

The truncated L2 hyperbolic paraboloid is a new hyperbolic paraboloid useful for creating additional cellular, lattice and labyrinthal structures.

When the n-fold hyperbolic paraboloids are joined at their hyperbolic paraboloid faces they become interlocked due to the saddle shaped compound curvature of the hyperbolic paraboloids.

The hyperbolic paraboloids specifically defined by the CT and/or the mathematical equation above, they can be used to create new cellular structures with hyperbolic paraboloid shaped walls.

The hyperbolic paraboloids have an inherent rigidity due to the compound curvature of the hyperbolic paraboloid similar to the increased rigidity obtained by forming a cylinder out of sheet of paper which is more rigid that a flat sheet yet has the same thickness.

The L1 hyperbolic paraboloids can be continuously connected to create a cellular structure that repeats throughout space.

The hyperbolic paraboloids described herein could be affixed to other geometric objects such as square bars or spheres allowing these other geometric objects to be joined in an interlocking fashion.

CONCLUSIONS, RAMIFICATIONS, AND SCOPE

Accordingly the hyperbolic paraboloids of the various embodiments can be used to create new aesthetic and utilitarian structures and toys. Furthermore these structures have additional advantages:

They can be made to be any size by scaling the dimensions proportionally with the CT and/or the mathematical equation above, which define their edge lengths and spatial arrangements.

They can be made of metal, plastic, foam, ceramic, glass, wood, masonry or other materials.

They can be made in various colors or color combinations.

They can be easily modified to provide a means of attachment to each other or to other structural components. The potential means of attachment include something as simple as putting a hole through them for attachment hardware or the use of adhesives.

They are modular allowing creation of many different composite structures.

These geometric objects could be used as toys or parts of toys.

Although the descriptions above contain many specifics, these should not be construed as limiting the scope of the embodiments but as merely providing illustrations of some of the presently preferred embodiments. For example, another embodiment of value is a three dimensional latticework of n-HyPars which results from the connection of multiple n-HyPars at their respective axial vertices and then also making additional connections at selected circumferential vertices.

Thus the scope of the embodiments should be determined by the appended claims and their legal equivalents, rather than by the examples given.

I claim:

1. Correlated hyperbolic paraboloid structural members for use as interconnectable structures or as toys comprising:
   a. a correlating tetrahedron means to imbue said correlated hyperbolic paraboloids with characteristic dimensions suitable for interconnection, said correlating tetrahedron having two opposite edges of equal length, designated L2, and four other edges of equal length, designated L1, and
   a". an integer number, n, n greater than or equal to 3, of said correlating tetrahedrons able to be arranged contiguously around a central axis with one of said L2 edges on said central axis, wherein said L1 edges of adjacent said correlating tetrahedrons congruent, and
   a". the relationship of n, L1 and L2 conforming to the mathematical equation;

$$\frac{L1}{L2} = \frac{\left[1 + \left(\frac{1}{\sin\frac{360°}{2n}}\right)^2\right]^{\frac{1}{2}}}{2}$$

b. said correlated hyperbolic paraboloid structural members constructed between said L1 and said L2 edges of said correlating tetrahedron selected from the group consisting of;
      I. a said correlated hyperbolic paraboloid having said four L1 edges of said correlating tetrahedron and a distance between opposite corners of said L2,
      II. a said correlated hyperbolic paraboloid having two opposite said L2 edges and two other opposite said L1 edges connecting said L2 edges in a right handed sense analogous to a right handed helix and a distance between opposite corners of said L1,
      III. a truncated said correlated hyperbolic paraboloid having two edges that are half the length of said L2 edges, a said L1 length edge that joins said L2 edges in a right handed sense analogous to a right handed helix and a fourth edge between the midpoints of said L2 edges,
      IV. a said correlated hyperbolic paraboloid having two opposite said L2 edges and two other opposite said L1 edges connecting said L2 edges in a left handed sense analogous to a left handed helix and a distance between opposite corners of said L1,
      V. a truncated said correlated hyperbolic paraboloid having two edges that are half the length of said L2 edges, a said L1 length edge that joins said L2 edges in a left handed sense analogous to a left handed helix and a fourth edge between the midpoints of said L2 edges,
   c. wherein said correlated hyperbolic paraboloid structural members provide spatially coincident corners, edges and/or faces for connection when placed adjacently,
   whereby said correlated hyperbolic paraboloid structural members are used individually, a plurality are connected to form a multitude of structures and/or are used as toys.

2. Structures, designated n-fold hyperbolic paraboloids, constructed from said correlated hyperbolic paraboloid I as in claim 1 further including,
   said n of said correlated hyperbolic paraboloid I arranged symmetrically around a central axis with two opposite corners of each touching said central axis and said L1 edges of adjacent said correlated hyperbolic paraboloids congruent,
   said n-fold hyperbolic paraboloids further configurable as linear arrangements of two or more said n-fold hyperbolic paraboloids joined at their said correlated hyperbolic paraboloid faces along the perpendicular lines at the zero curvature center points of said correlated hyperbolic paraboloid faces and the axial vertices of one placed between adjacent circumferential vertices of an adjacent one,
   wherein said n-fold hyperbolic paraboloids provide spatially coincident edges, corners and/or faces when placed adjacent other said n-fold hyperbolic paraboloids whereby said n-fold hyperbolic paraboloids are used individually, a plurality are connected to form a multitude of structures, are further connected to other structures, or used as toys.

3. Structures, designated n-fold hyperbolic paraboloid lattice assembles, constructed from said correlated hyperbolic paraboloids I, II and IV as in claim 1 further including,
said n of said correlated hyperbolic paraboloids I, II and IV, arranged symmetrically around a central axis, said arrangement containing at least one said correlated hyperbolic paraboloids II or IV of claim 1, at least two of said L1 edges between adjacent said correlated hyperbolic paraboloids I, II and IV congruent,
wherein said n-fold hyperbolic lattice assemblies provide spatially coincident edges, corners and/or faces suitable for connection when placed adjacent other said correlated hyperbolic paraboloids,
whereby said n-fold hyperbolic paraboloid lattice assemblies can be used individually, a plurality being further configurable as linear arrangements of two or more said n-fold hyperbolic paraboloid lattice assemblies joined at their said L1 edges and/or at their said L2 edges, connected to other said correlated hyperbolic paraboloids, connected to other structures and/or used as toys.

4. Structures, designated n-fold hyperbolic paraboloid cells, constructed from said correlated hyperbolic paraboloids I, II, III, IV and/or V as in claim 1 further including,
wherein said n-fold hyperbolic paraboloid cells are constructed by joining a pair of said correlated hyperbolic paraboloids I, II, III, IV and/or V,
wherein said n-fold hyperbolic paraboloid cells provide spatially coincident corners, edges and/or faces for connection when placed adjacent other said correlated hyperbolic paraboloids,
whereby said n-fold hyperbolic paraboloid cells are used individually, a plurality are connected to form a multitude of structures, are connected to other said correlated hyperbolic paraboloids, are connected to other structures, and/or used as toys.

5. Correlated hyperbolic paraboloids as in claim 1 further including,
Individual correlated hyperbolic paraboloids affixed to other structural shapes as appurtenances to enable interlocking and connection of said other structural shapes at said correlated hyperbolic paraboloid edges, corners and/or faces.

6. Correlated hyperbolic paraboloids as in claim 1, further including,
said correlated hyperbolic paraboloids having attachment features for use as toys.

7. A method for correlating and sizing correlated hyperbolic paraboloid structural members for use as interconnectable structures and as toys comprising;
a. using a correlating tetrahedron means to imbue said correlated hyperbolic paraboloids with characteristic dimensions suitable for interconnection, said correlating tetrahedron having two opposite edges of equal length, designated L2, and four other edges of equal length, designated L1,
an integer number, n, n greater than or equal to 3, of said correlating tetrahedrons able to be arranged contiguously around a central axis with one said L2 edge on said central axis, wherein said L1 edges of adjacent said correlating tetrahedrons congruent,
the relationship of n, L1 and L2 conforming to the mathematical equation;

$$\frac{L1}{L2} = \frac{\left[1 + \left(\frac{1}{\sin\frac{360°}{2n}}\right)^2\right]^{\frac{1}{2}}}{2}$$

and
b. constructing said correlated hyperbolic paraboloid structural members between said L1 and said L2 edges of said correlating tetrahedron selected from the group consisting of;
I. a said correlated hyperbolic paraboloid having said four L1 edges of said correlating tetrahedron and a distance between opposite corners of said L2,
II. a said correlated hyperbolic paraboloid having two opposite said L2 edges and two other opposite said L1 edges connecting said L2 edges in a right handed sense analogous to a right handed helix and a distance between opposite corners of said L1,
III. a truncated said correlated hyperbolic paraboloid having two edges that are half the length of said L2 edges, a said L1 length edge that joins said L2 edges in a right handed sense analogous to a right handed helix and a fourth edge between the midpoints of said L2 edges,
IV. a said correlated hyperbolic paraboloid having two opposite said L2 edges and two other opposite said L1 edges connecting said L2 edges in a left handed sense analogous to a left handed helix and a distance between opposite corners of said L1,
V. a truncated said correlated hyperbolic paraboloid having two edges that are half the length of said L2 edges, a said L1 length edge that joins said L2 edges in a left handed sense analogous to a left handed helix and a fourth edge between the midpoints of said L2 edges,
c. wherein said correlated hyperbolic paraboloid structural members provide spatially coincident corners, edges and/or faces for connection when placed adjacently,
whereby said correlated hyperbolic paraboloid structural members are used individually, a plurality are connected to form a multitude of structures and/or are used as toys.

8. Structures, designated n-fold hyperbolic paraboloids, sized as in claim 7, further including,
said n of said correlated hyperbolic paraboloid I as in claim 7 arranged symmetrically around a central axis with two opposite corners of each touching said central axis and said L1 edges of adjacent said correlated hyperbolic paraboloids I congruent,
said n-fold hyperbolic paraboloids further configurable as linear arrangements of two or more said n-fold hyperbolic paraboloids joined at their said correlated hyperbolic paraboloid faces along the perpendicular lines at the zero curvature center points of said correlated hyperbolic paraboloid faces and the axial vertices of one placed between adjacent circumferential vertices of an adjacent one,
wherein said n-fold hyperbolic paraboloids provide spatially coincident edges, corners and/or faces when placed adjacent other said n-fold hyperbolic paraboloids
whereby said n-fold hyperbolic paraboloids are used individually, a plurality are connected to form a multitude of structures, are connected to other said correlated hyperbolic paraboloids, are connected to other structures, and/or used as toys.

9. A method for joining n-fold hyperbolic paraboloids with n=4 as in claim 8, further including,
- placing the axial vertices of a first said n-fold hyperbolic paraboloid between two adjacent circumferential vertices of a second said n-fold hyperbolic paraboloid, an action that also places the axial vertices of the second between two adjacent circumferential vertices of the first—a hyperbolic paraboloid face of the first now being congruent with a hyperbolic paraboloid face of the second,
- said 4-fold hyperbolic paraboloids being configured as other shapes selected from the group consisting of a bar, a linear array, an I beam, an H beam, a box beam, an angle beam, and a channel beam.

10. Structures, designated n-fold correlated hyperbolic paraboloid cells, sized as in claim 7 further including,
- joined pairs constructed from said correlated hyperbolic paraboloids I, II, III, IV and/or V as in claim 7,
- wherein said joined pairs are further connectable as a joined plurality to form a multitude of hyperbolic paraboloid walled cellular, lattice and/or labyrinthal structures,
- whereby said n-fold hyperbolic paraboloid cells are used individually, a plurality are connected to form a multitude of structures, are connected to other said correlated hyperbolic paraboloids, are connected to other structures, and/or used as toys.

11. Structures, designated n-fold hyperbolic paraboloid lattice assembles, sized as in claim 7, further including,
- said n-fold hyperbolic paraboloid lattice assemblies constructed from said correlated hyperbolic paraboloids I, II, and IV as in claim 7,
- said n of said correlated hyperbolic paraboloids I, II, and IV, arranged symmetrically around a central axis, said arrangement containing at least one of said correlated hyperbolic paraboloids II or IV,
- wherein said n-fold hyperbolic lattice assemblies provide spatially coincident edges, corners and/or faces suitable for connection when placed adjacent other said correlated hyperbolic paraboloids,
- whereby said n-fold hyperbolic paraboloid lattice assemblies can be used individually, a plurality being further configurable as linear arrangements of two or more said n-fold hyperbolic paraboloid lattice assemblies joined at their said L1 edges and/or at their said L2 edges, are connected to other said correlated hyperbolic paraboloids, are connected to other structures and/or used as toys.

12. Structures, designated n=4 correlated hyperbolic paraboloid cells sized as in claim 7 further including,
- joining two of said correlated hyperbolic paraboloid I as in claim 7 with n=4 resulting in a cell opening having four said L1 edges arranged as a rhombus with two opposite angles of 60 degrees and two other opposite angles of 120 degrees,
- a plurality of said n=4 correlated hyperbolic paraboloid cells being further configurable as other structural shapes selected from the group consisting of a triangular cross sectioned cellular bar, a 4-fold hyperbolic paraboloid, a six celled rhombohedron, a twelve celled hyperbolic paraboloid rhombic dodecahedron, a three celled hyperbolic paraboloid cell tri-hedron,
- wherein said n=4 correlated hyperbolic paraboloids cells provide spatially coincident edges, corners and/or faces when placed adjacent other said correlated hyperbolic paraboloids,
- whereby said n=4 correlated hyperbolic paraboloid cells are used individually, a plurality are connected to form a multitude of structures, are connected to other said correlated hyperbolic paraboloids, are connected to other structures, and/or used as toys.

13. Structures composed of said correlated hyperbolic paraboloids sized as in claim 7, further including, a joined plurality of said hyperbolic paraboloids configured to form a multitude of hyperbolic paraboloid walled cellular, lattice and/or labyrinthal structures,
- whereby said structures are further connectable to themselves, connectable to other said correlated hyperbolic paraboloids, connectable to other structures and/or are used as toys.

14. Individual said correlated hyperbolic paraboloids sized as in claim 7 further including,
- said correlated hyperbolic paraboloids, affixed to other structural shapes as appurtenances to enable interlocking and connection of said other structural shapes.

15. Individual said correlated hyperbolic paraboloids sized as in claim 7, further including,
- said correlated hyperbolic paraboloids having attachment features for use as toys.

16. Hyperbolic paraboloid faced structural members, designated n-fold hyperbolic paraboloids, n an integer equal to or greater than 3, for use as interconnectable structures or toys comprising;
- a. a correlating tetrahedron means used to imbue said hyperbolic paraboloids faces with characteristic dimensions suitable for interconnection, said correlating tetrahedron having two opposite edges of equal length, designated L2, and four other edges of equal length, designated L1,
- an integer number, n, n greater than or equal to 3, of said correlating tetrahedrons able to be arranged contiguously around a central axis with one of said L2 edges on said central axis, wherein said L1 edges of adjacent said correlating tetrahedrons congruent,
- the relationship of n, L1 and L2 conforming to the mathematical equation;

$$\frac{L1}{L2} = \frac{\left[1 + \left(\frac{1}{\sin\frac{360°}{2n}}\right)^2\right]^{\frac{1}{2}}}{2}$$

and
- a'. said hyperbolic paraboloid faces having four said equal length L1 edges arranged symmetrically around a perpendicular line at a zero curvature center point of said hyperbolic paraboloid face and a distance between opposite corners of said length L2, and
- a". said hyperbolic paraboloid faces arranged symmetrically around an axial axis with two opposite corners of each touching said axial axis, said edges of length L1 being congruent with said L1 edges of adjacent said hyperbolic paraboloid faces resulting in said n-fold hyperbolic paraboloid faces enclosing an inner volume and having two axial vertices and n circumferential vertices symmetrically spaced about said axial axis in a mid-plane halfway between said axial vertices and perpendicular to said axial axis, b. wherein the length of said axial axis is equal to the length between adjacent said circumferential vertices, thereby enabling the stacking of one said n-fold hyperbolic paraboloid to a second said n-fold hyperbolic paraboloid at their said hyperbolic paraboloid faces and along their respective said perpendicular lines at their zero curvature center points by placing said axial vertices of the first between two adjacent said circumferential vertices of the second, an action that also results in placing said axial vertices of the second between two adjacent said circumferential vertices of the first—a hyperbolic paraboloid face of the first now being congruent with a hyperbolic paraboloid face of the second, thereby interlocking said two n-fold hyperbolic paraboloids against rotation about said perpendicular lines at their zero curvature center points and against translation in the plane perpendicular to said perpendicular lines at their zero curvature center points, with said stacking also being allowed at all other said hyperbolic paraboloid faces, c. wherein said n-fold hyperbolic paraboloids provide spatially coincident edges, corners and/or faces when placed adjacent other said n-fold hyperbolic paraboloids whereby said n-fold hyperbolic paraboloids are used individually, a plurality are connected to form a multitude of structures, further connected to other structures, or used as toys.

17. Correlated hyperbolic paraboloid structural members joined as assemblies, designated n-fold hyperbolic paraboloid lattice assemblies for use as interconnectable structures and as toys comprising:

a. a correlating tetrahedron means to imbue said correlated hyperbolic paraboloids with characteristic dimensions suitable for interconnection, said correlating tetrahedron having two opposite edges of equal length, designated L2, and four other edges of equal length, designated L1, and a''. an integer number, n, n greater than or equal to 3, of said correlating tetrahedrons able to be arranged contiguously around a central axis with one of said L2 edges on said central axis, wherein said L1 edges of adjacent said correlating tetrahedrons congruent, and a''. the relationship of n, L1 and L2 conforming to the mathematical equation;

$$\frac{L1}{L2} = \frac{\left[1 + \left(\frac{1}{\sin\frac{360°}{2n}}\right)^2\right]^{\frac{1}{2}}}{2}$$

b. said correlated hyperbolic paraboloid structural members constructed between said L1 and said L2 edges of said correlating tetrahedron selected from the group consisting of;

I. a said correlated hyperbolic paraboloid having said four L1 edges of said correlating tetrahedron and a distance between opposite corners of said L2, II. a said correlated hyperbolic paraboloid having two opposite said L2 edges and two other opposite said L1 edges connecting said L2 edges in a right handed sense analogous to a right handed helix and a distance between opposite corners of said L1, III. a truncated said correlated hyperbolic paraboloid having two edges that are half the length of said L2 edges, a said L1 length edge that joins said L2 edges in a right handed sense analogous to a right handed helix and a fourth edge between the midpoints of said L2 edges, IV. a said correlated hyperbolic paraboloid having two opposite said L2 edges and two other opposite said L1 edges connecting said L2 edges in a left handed sense analogous to a left handed helix and a distance between opposite corners of said L1, V. a truncated said correlated hyperbolic paraboloid having two edges that are half the length of said L2 edges, a said L1 length edge that joins said L2 edges in a left handed sense analogous to a left handed helix and a fourth edge between the midpoints of said L2 edges, c. n said correlated hyperbolic paraboloids having two opposite said L2 edges and two other opposite said L1 edges connecting said L2 edges in a right or left handed sense analogous to a right or left handed helix and a distance between opposite corners of said L1 arranged symmetrically around a central axis with one said L2 edge of each congruent with said central axis and said other L2 edge connected to adjacent said correlated hyperbolic paraboloid L2 edges at their extremities resulting in said n-fold hyperbolic paraboloid lattice assemblies having two axial vertices and n circumferential vertices symmetrically spaced about said central axis in a mid-plane halfway between said axial vertices and perpendicular to said axial axis, thereby causing the length of said axial axis to become equal to the length between adjacent said circumferential vertices, and further resulting in an n-sided polygon at the mid-plane, d. wherein said n-fold hyperbolic lattice assemblies provide spatially coincident edges, corners and/or faces suitable for connection when placed adjacent other said correlated hyperbolic paraboloids, whereby said n-fold hyperbolic paraboloid lattice assemblies can be used individually, a plurality being further configurable as linear arrangements of two or more said n-fold hyperbolic paraboloid lattice assemblies joined at their said L1 edges and/or at their said L2 edges, are connected to other said correlated hyperbolic paraboloids, are connected to other structures and/or are used as toys.

18. Correlated hyperbolic paraboloid structural members joined as pairs to form n-fold hyperbolic paraboloid cells for use as interconnectable structures and toys comprising:

a. a correlating tetrahedron means to imbue said correlated hyperbolic paraboloids with characteristic dimensions suitable for interconnection, said correlating tetrahedron having two opposite edges of equal length, designated L2, and four other edges of equal length, designated L1, and a''. an integer number, n, n greater than or equal to 3, of said correlating tetrahedrons able to be arranged contiguously around a central axis with one said L2 edges on said central axis, wherein said L1 edges of adjacent said correlating tetrahedrons congruent, and a''. the relationship of n, L1 and L2 conforming to the mathematical equation;

$$\frac{L1}{L2} = \frac{\left[1 + \left(\frac{1}{\sin\frac{360°}{2n}}\right)^2\right]^{\frac{1}{2}}}{2}$$

b. said correlated hyperbolic paraboloid structural members constructed between said L1 and said L2 edges of said correlating tetrahedron selected from the group consisting of;
  I. a said correlated hyperbolic paraboloid having said four L1 edges of said correlating tetrahedron and a distance between opposite corners of said L2,
  II. a said correlated hyperbolic paraboloid having two opposite said L2 edges and two other opposite said L1 edges connecting said L2 edges in a right handed sense analogous to a right handed helix and a distance between opposite corners of said L1,
  III. a truncated said correlated hyperbolic paraboloid having two edges that are half the length of said L2 edges, a said L1 length edge that joins said L2 edges in a right handed sense analogous to a right handed helix and a fourth edge between the midpoints of said L2 edges,
  IV. a said correlated hyperbolic paraboloid having two opposite said L2 edges and two other opposite said L1 edges connecting said L2 edges in a left handed sense analogous to a left handed helix and a distance between opposite corners of said L1,
  V. a truncated said correlated hyperbolic paraboloid having two edges that are half the length of said L2 edges, a said L1 length edge that joins said L2 edges in a left handed sense analogous to a left handed helix and a fourth edge between the midpoints of said L2 edges,
c. wherein said n-fold hyperbolic paraboloid cells are constructed by joining a pair of said correlated hyperbolic paraboloids,
d. wherein said n-fold hyperbolic paraboloid cells provide spatially coincident corners, edges and/or faces for connection when placed adjacent other said correlated hyperbolic paraboloids,
whereby said n-fold hyperbolic paraboloid cells are used individually, a plurality are connected to form a multitude of structures, connected to other said correlated hyperbolic paraboloids, and/or used as toys.

\* \* \* \* \*